United States Patent
Chan et al.

(10) Patent No.: US 12,124,587 B2
(45) Date of Patent: Oct. 22, 2024

(54) AUTOMATIC VERIFICATION OF DECENTRAILIZED PROTOCOLS

(71) Applicant: PayPal, Inc., San Jose, CA (US)

(72) Inventors: Michael Jim Tien Chan, San Jose, CA (US); Vladimir Bacvanski, Portola Valley, CA (US); Oluwatomisin Olayemi Jenrola, Toronto (CA)

(73) Assignee: PayPal, Inc., San Jose, CA (US)

( * ) Notice: Subject to any disclaimer, the term of this patent is extended or adjusted under 35 U.S.C. 154(b) by 365 days.

(21) Appl. No.: 17/545,831

(22) Filed: Dec. 8, 2021

(65) Prior Publication Data
US 2023/0177167 A1    Jun. 8, 2023

(51) Int. Cl.
G06F 21/00    (2013.01)
G06F 21/57    (2013.01)
H04L 9/40    (2022.01)

(52) U.S. Cl.
CPC ............ *G06F 21/577* (2013.01); *H04L 63/10* (2013.01); *H04L 63/20* (2013.01); *G06F 2221/033* (2013.01)

(58) Field of Classification Search
CPC . G06F 21/577; G06F 2221/033; H04L 63/10; H04L 63/20; H04L 63/1433
See application file for complete search history.

(56) References Cited

U.S. PATENT DOCUMENTS

| | | |
|---|---|---|
| 2019/0305957 A1 | 10/2019 | Reddy et al. |
| 2019/0373472 A1 | 12/2019 | Smith et al. |
| 2020/0118131 A1 * | 4/2020 | Diriye ................... H04L 9/3239 |
| 2020/0372154 A1 | 11/2020 | Bacher et al. |
| 2021/0049281 A1 * | 2/2021 | Braghin ................ H04L 9/0637 |
| 2021/0110047 A1 * | 4/2021 | Fang .................... H04L 63/1433 |
| 2022/0318399 A1 * | 10/2022 | Rodler .................. G06F 21/577 |

FOREIGN PATENT DOCUMENTS

WO    WO-2022108318 A1 *   5/2022

OTHER PUBLICATIONS

ISA/US, Int'l Search Report and Written Opinion issued in appl. No. PCT/US22/51948, dated Mar. 9, 2023, 6 pgs.
Al-Rakhami, M.S. et al. | "A Blockchain-Based Trust Model for the Internet of Things Supply Chain Management". Sensors, 2021, 21, 1759. https://doi.org/10.3390/s21051759, 15 pages.

* cited by examiner

*Primary Examiner* — Michael M Lee
(74) *Attorney, Agent, or Firm* — Greenberg Traurig, LLP

(57) ABSTRACT

Novel technical ways of analyzing a blockchain system using machine learning are presented. In various embodiments, A system can deploy, by a first entity, a policy smart contract on a blockchain to analyze a first smart contract deployed by a second entity, wherein the policy smart contract is governed by a set of rules, wherein the policy smart contract performs a first assessment that includes analyzing a set of functionalities of the first smart contract and detects a set of vulnerabilities associated with the first smart contract based on the set of rules. The system can determine at a first time a risk score corresponding to the first smart contract based on the analyzing and the detecting. In response to determining that the risk score is above a threshold score, the system can restrict users of a first platform corresponding to the first entity from accessing the first smart contract.

20 Claims, 19 Drawing Sheets

AUTOMATIC VERIFICATION OF DECENTRAILIZED PROTOCOLS

TECHNICAL FIELD

The subject disclosure relates generally to smart contracts on blockchain platforms, and more specifically to risk assessment of policies associated with respective smart contracts on blockchain platform(s).

BACKGROUND

Electronic transactions with smart contracts are digitally recorded via blockchains. A blockchain can be a decentralized list of electronic blocks, where each electronic block contains a timestamp of one or more transactions, metadata characterizing the one or more transactions, and/or a cryptographic hash of the previous electronic block. Given the increasing prevalence of electronic transactions involving smart contracts, there exists a need for systems and/or techniques that can electronically analyze policies associated with a smart contract in order to estimate levels of risk associated with transactions associated with the smart contract and/or to otherwise detect fraud, determine compliance and to provide enhanced computer security for users.

Systems and/or techniques that can ameliorate one or more of these issues are desirable.

DETAILED DESCRIPTION

Figure 1:
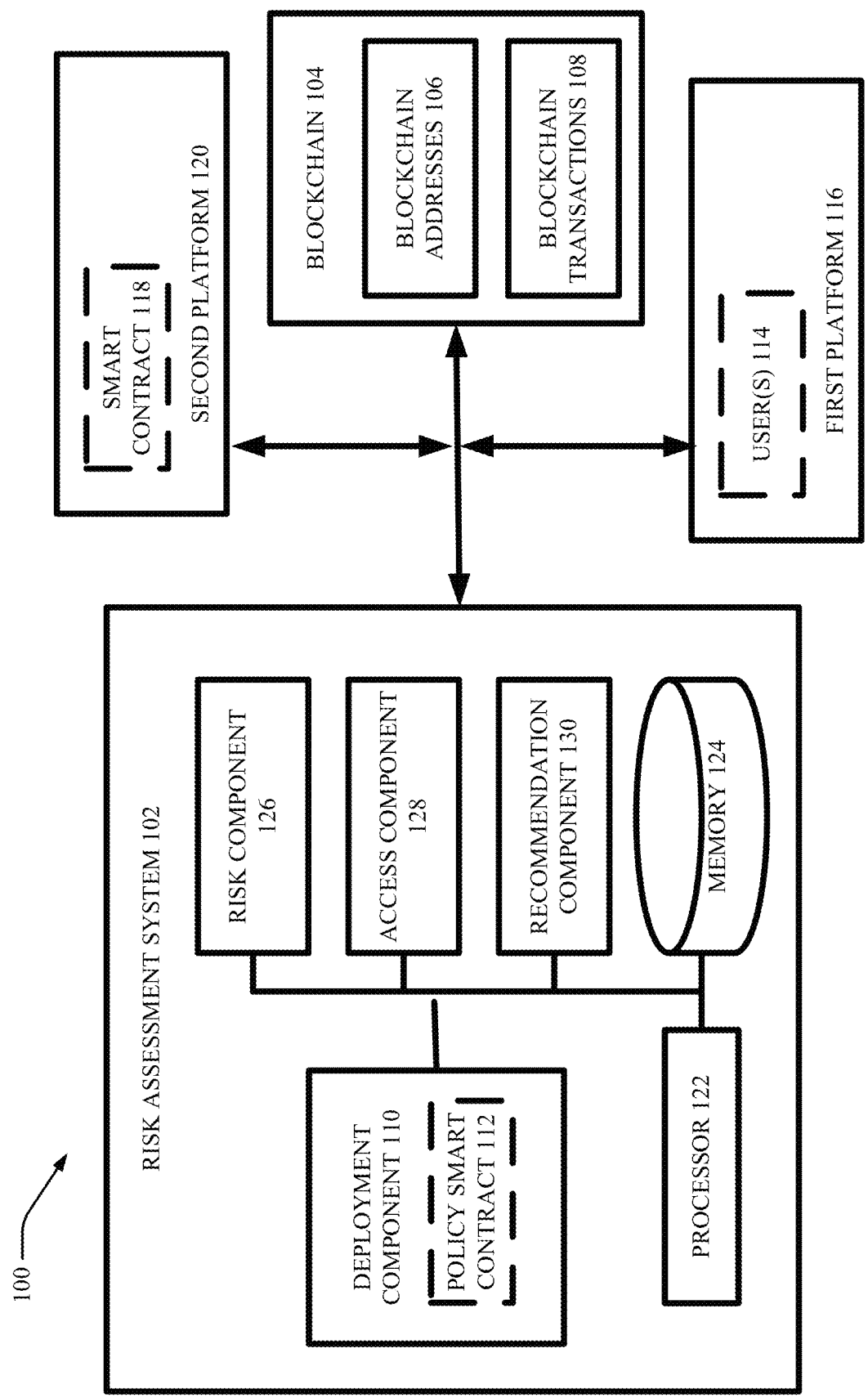
FIG. 1 illustrates a high-level block diagram of an example, non-limiting system that facilitates analyzing policies associated with a smart contract in accordance with one or more embodiments described herein.

The following detailed description is not intended to limit embodiments and/or application or uses of embodiments. Furthermore, there is no intention to be bound by any expressed or implied information presented in the preceding Background section, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Blockchain technology is widely regarded as a revolutionary, peer-to-peer, decentralized option for data organization; it allows for formation of decentralized monetary systems such as crypto-coins, smart contracts, and other resources that can be managed online such as smart property. Blockchain can be used to distribute ledger systems and other financial transactions, and allows different entities to exchange data and transactions quickly without intervention or verification by third parties. This can be accomplished through a shared data framework that utilizes computer algorithms to create real-time self-updates. Blockchain technology can also settle financial transactions without mediation from banks and other trusted institutions.

Smart contracts clarify and interpret relations regarding the blockchain and supply chain. Parties negotiate and agree on conditions—once the parties' conditions for an exchange are fulfilled, a smart contract is created, coded, and archived in a blockchain structure. Data can be recorded and managed through use of devices such as radio frequency identification device (RFID), quick-response codes, and wireless sensor networks (WSNs). Once the contract is created, goods and funds are transferred according to terms of the contract. No human mediation is required, and the transaction can proceed faster, and at less cost than a conventional paper-centric contract process. As most if not all participants in a network, associated with the transaction, have a copy of every transaction record, there is improved mutual trust.

A common framework for blockchain is a decentralized database in which transactions are recorded using a virtually unmodifiable cryptographic signature. Records can be added to the decentralized database to create blocks, that are protected against manipulation and alteration. Each block is connected to a previous block and has a timestamp. Different entities can create smart contracts based on a blockchain, without intervention from other entities. The data contained in such a smart contract is difficult to alter, as blocks cannot be changed after being formed. Thus, a smart contract on a blockchain can be a set of actions implemented on contributing nodes, creating mutual agreement in results of such transactions without need for third-party mediation of information and money.

In an example, parties negotiate and agree on conditions relating to a transaction. Once both parties' conditions for the exchange are fulfilled, a smart contract is created, coded, and archived in a blockchain structure. Data is recorded and managed (e.g., through use of Internet of Things (IoT) devices such as RFID, quick-response codes, and WSNs). Once the smart contract is created, goods and funds are transferred according to the terms of smart contract. No human mediation is required, and the transaction can proceed faster, at less cost as compared to non-blockchain transactions.

Electronic transactions involving smart contracts can be digitally recorded via blockchains. A blockchain can be a decentralized list of electronic blocks, where each electronic block contains a timestamp of one or more transactions (e.g., the time at and/or about which such one or more transactions occurred), metadata characterizing the one or more transactions (e.g., amounts of cryptocurrencies involved in such one or more transactions, blockchain addresses from which and/or to which such amounts of cryptocurrencies were transferred during such one or more transactions), and/or a cryptographic hash of the previous electronic block. Because each electronic block can include a cryptographic hash of the previous electronic block, the blockchain can be resistant to retroactive tampering, which has led to a surge in the popularity of blockchain technology and a commensurate surge in the popularity of cryptocurrencies and increasing prevalence of electronic transactions involving smart contracts. However, as blockchain transactions and associated smart contracts become ubiquitous, the door is open to risk. Not every smart contract is equal from a risk perspective, and consequently there exists a need for systems and/or techniques that can electronically analyze a blockchain in order to estimate levels of risk associated with different policies associated with respective smart contracts.

For example, an entity can create a smart contract with terms or policies that are not secure, and a lay party could unwittingly agree to smart contract terms that introduce risk, including fraud. A given trusted platform, e.g., a lending institution, may desire greater control over access by users of its platform to smart contracts. Innovations described and claimed herein relate to system(s) and method(s) that deploy policy smart contracts that analyze policies associated with respective smart contracts, and generates risk scores associated with respective smart contracts. If risk associated with a particular smart contract (e.g., risk score exceeds a threshold value), the system can restrict access of its users to the high-risk smart contract.

Various embodiments of the subject innovation can address one or more of these technical problems. One or more embodiments described herein can include systems, computer-implemented methods, apparatus, and/or computer program products that can facilitate smart contract risk assessment via deployment of a policy smart contract. In other words, various embodiments described herein can include a computerized tool (e.g., any suitable combination of computer-executable hardware and/or computer-executable software) that can electronically receive as input policies associated with a smart contract and that can electronically produce as output risk scores that indicate levels of risk associated with respective smart contracts that are recorded in the blockchain.

In general, a smart contract can be computer code that automatically executes all or parts of an agreement and is stored on a blockchain-based platform. In an aspect, the smart contract (or code) can be the entirety of an agreement between parties. In another aspect, the smart contract can be code that implements certain provisions of a traditional written contract, e.g., moving funds between parties to the smart contract. The smart contract can be replicated across multiple nodes of a blockchain and, therefore, benefit from security, permanence and immutability associated with blockchain technology.

A smart contract can for example execute actions if pre-conditions are satisfied, or alternatively not execute certain actions if pre-conditions are not satisfied. As adoption of blockchain technology spreads, and as more assets are tokenized or go "on chain," smart contracts will become increasingly complex and capable of handling sophisticated transactions. Consequently, certain provisions or policies of a given smart contract may leave a party at disadvantage or even vulnerable. Embodiments described and claimed herein can analyze policies associated with a smart contract, identify potential issues associated with the smart contract relative to one or more parties, and suggest updates to the policies of the smart contract, or even restrict access to one or more parties to the smart contract. If recommended updates are made to the smart contract, and a subsequent review or analysis of the policies deems the set of policies if now acceptable, e.g., risk score is below a threshold, access to the smart contract by the one or more parties can be granted.

For example, a set of policies associated with a smart contract may create uncertainty regarding whether protection is afford under the Uniform Commercial Code (UCC), Uniform Electronic Transactions Act (UETA), Electronic Signatures Recording Act (E-Sign Act), establishment of a security interest at state or federal level, insurance, security protocols, compliance, accreditations, terms, provisions, standards, protocols . . . , and other contractual provisions that increase or decrease risk associated with the contract. A policy smart contract deployed by a system in accordance with innovations described and claimed herein can facilitate identifying unacceptable or potentially problematic features, rules, triggers, terms, provisions, protocols, policies or the like (referred to herein as policies for sake of brevity) of the smart contract, and as discussed above provide recommendations to update the policies, allow or restrict access to the smart contract based on determined or inferred risk.

In an embodiment, the system can recommend updates to policies of a smart contract in an effort to lower risk associated therewith. If after implementing the updates, and after conducting a subsequent analysis, e.g., at time ($t_2$), and the risk score is below a threshold, the system can permit access by its users to the smart contract.

It should be appreciated that the herein figures and associated description are non-limiting examples.

FIG. 1 illustrates a high-level block diagram of an example, non-limiting system 100 that can facilitate smart contract risk assessment via deployment of a policy smart contract in accordance with one or more embodiments described herein.

As shown, a smart contract risk assessment system 102 can be electronically integrated, via any suitable wired and/or wireless electronic connection, with a blockchain 104. In various aspects, the blockchain 104 can be any suitable type of blockchain in which a set of blockchain addresses 106 can be electronically recorded/documented and/or in which a set of blockchain transactions 108 can be electronically recorded/documented. In various instances, the set of blockchain addresses 106 can include any suitable number of blockchain addresses.

Similarly, the set of blockchain transactions 108 can include any suitable number of blockchain transactions. In various instances, the set of blockchain transactions 108 can have occurred between and/or among the set of blockchain addresses 106. Accordingly, the blockchain 104 can be considered as a digital record of the set of blockchain transactions 108 in which the set of blockchain addresses 106 participated.

More specifically, the blockchain 104 can be a decentralized digital ledger made up of a sequence of electronic blocks. In various instances, any given electronic block can include a timestamp (e.g., time and/or date) associated with one or more blockchain transactions (e.g., some of the set of blockchain transactions 108). In various cases, the given electronic block can also include metadata pertaining to the one or more blockchain transactions, such as amounts and/or types of cryptocurrency involved in the one or more blockchain transactions, and/or such as one or more blockchain addresses (e.g., some of the set of blockchain addresses 106) to which and/or from which such amounts and/or types of cryptocurrency were transferred. In some cases, the given electronic block can further include metadata pertaining to the one or more blockchain addresses, such as age of a blockchain address (e.g., days, months, and/or years since registration and/or creation of the blockchain address) and/or number of smart contract tokens obtained by a blockchain address. Moreover, in various aspects, the given electronic block can include any suitable cryptographic hash of the preceding electronic block. In various instances, because each electronic block in the blockchain 104 can include a cryptographic hash of the previous electronic block, the blockchain 104 can be resistant to retroactive tampering and/or falsification.

Again, the blockchain 104 can be considered as a digital record of the set of blockchain transactions 108 that have been performed by the set of blockchain addresses 106. In other words, the blockchain 104 can be considered as conveying past transactional behaviors of the set of blockchain addresses 106. In various aspects, it can be useful to assign risk scores to each of the set of blockchain addresses 106. Indeed, when any suitable entity is given an opportunity to transact with any of a set of smart contracts, the entity can leverage such risk scores to determine whether to allow or decline access to the smart contract by users associated with the entity, e.g., users of a platform controlled by the entity. For instance, if a specific smart contract is associated with a high risk score (e.g., exceeding any suitable threshold value), transacting with the specific smart contract can be considered as too risky. On the other hand, if a specific smart contract is associated with a low risk score (e.g., beneath any suitable threshold value), transacting with the smart contract can be considered as safe or not too risky. As explained herein, the smart contract risk assessment system 102 can deploy, using deployment component 110, a policy smart contract 112 that electronically analyzes (on behalf of users 114 of a first platform 116 (e.g., centralized entity or decentralized entity)) a smart contract 118 associated with a second platform 120 (e.g., an application, decentralized application or other application/protocol that is built on top of blockchain 104 (or that leverages blockchain 104)) so as to electronically compute such risk scores for the smart contract 118, and mitigate risk to the users 114 and/or first platform 116. It is to be appreciated that the first platform 116 can be for example an entity (e.g., financial institutions, lender, underwriter, insurer, bank, service provider, etc.) that provisions services for its users, and desires to protect itself and its users from risk associated with certain smart contracts.

Applicant notes that computer operations and efficiency are improved by the prevention of a potentially fraudulent blockchain transaction. A fraudulent transaction is an unnecessary transaction (e.g., one the user would not willingly engage in). This transaction requires computing power, memory usage, energy usage, and network usage by the user's computer system, all of which can be conserved if the user does not participate in the transaction. Additionally, in the case of some smart contract transactions (such as Bit-Coin), there may be a heavy energy usage and computing power cost by a variety of mining systems to confirm the transaction within the relevant blockchain. This energy usage can also be conserved if the potentially problematic smart contract is not entered into by the user.

In various embodiments, the risk assessment system 102 can comprise a processor 122 (e.g., computer processing unit, microprocessor) and a computer-readable memory 124 that is operably and/or operatively and/or communicatively connected/coupled to the processor 122. The memory 124 can store computer-executable instructions which, upon execution by the processor 122, can cause the processor 122 and/or other components of the risk assessment system 102 (e.g., risk component 126, access component 128, recommendation component 130) to perform one or more acts. In various embodiments, the memory 124 can store computer-executable components (e.g., risk component 126, access component 128, recommendation component 130), and the processor 122 can execute the computer-executable components.

In various aspects, the blockchain 104 can be electronically maintained and/or stored in any suitable databases (not shown) and/or computing devices (not shown) that are remote from and/or local to the risk assessment component 102. In various instances, the risk assessment component 102 can electronically receive and/or retrieve, via any suitable data communication and/or data querying technique, the blockchain 104 from such databases and/or computing devices. That is, the risk assessment component 102 can electronically access the blockchain 104, such that other components of the risk assessment system 102 can electronically read, parse, and/or otherwise interact with the blockchain 104.

In various embodiments, the risk assessment system 102 can, using the deployment component 110, the policy smart contract 112 in connection with assessing risk on behalf of the user(s) 114 of the first platform 116. The policy smart contract 112 can be deployed to analyze a smart contract 118 associated with a second platform 120. In various aspects, the policy smart contract 112 can electronically read, parse, and/or decrypt the smart contract 118 and the blockchain 104, which can cause the policy smart contract 112 to identify the set of blockchain addresses 106 and/or the set of blockchain transactions 108 and/or policies associated with the smart contract 118.

In various embodiments, the risk component 126 can electronically calculate a risk score for the smart contract 118, e.g., based at least in part on one or more policies associated with the smart contract 118. In various instances, the risk component 126 can employ a risk formula to compute such risk scores. In various cases, the risk formula can be any suitable mathematical function that takes as an argument level of importance of a given policy of the smart contract 118. In various aspects, the risk formula can also take as an argument any other suitable information pertaining to the smart contract 118 (e.g., potential fraud, liability, security, financial exposure, unfavorable terms, compliance, regulatory issues . . . ). In various cases, the risk component 126 can electronically transmit such risk scores to any suitable computing device (not shown), as desired. If the risk component 126 determines that risk (e.g., risk score) of policies of the smart contract 118 are above a risk threshold (e.g., high risk), the recommendation component 130 can provide recommendations to an issuer of the smart contract 118 regarding updates to the policies of the smart contract 118 to facilitate lowering risk associated therewith. The access component 128 can regulate access to the smart contract 118 by the user(s)114 of the first platform 116; if the risk score is above a threshold, the access component 128 can restrict access by the user(s) 114 to the smart contract 118 and/or the second platform 120, or if the risk score is below the threshold, the access component 128 can permit access by the user(s) 114 to the smart contract 118 and/or the second platform 120.

Figure 2:
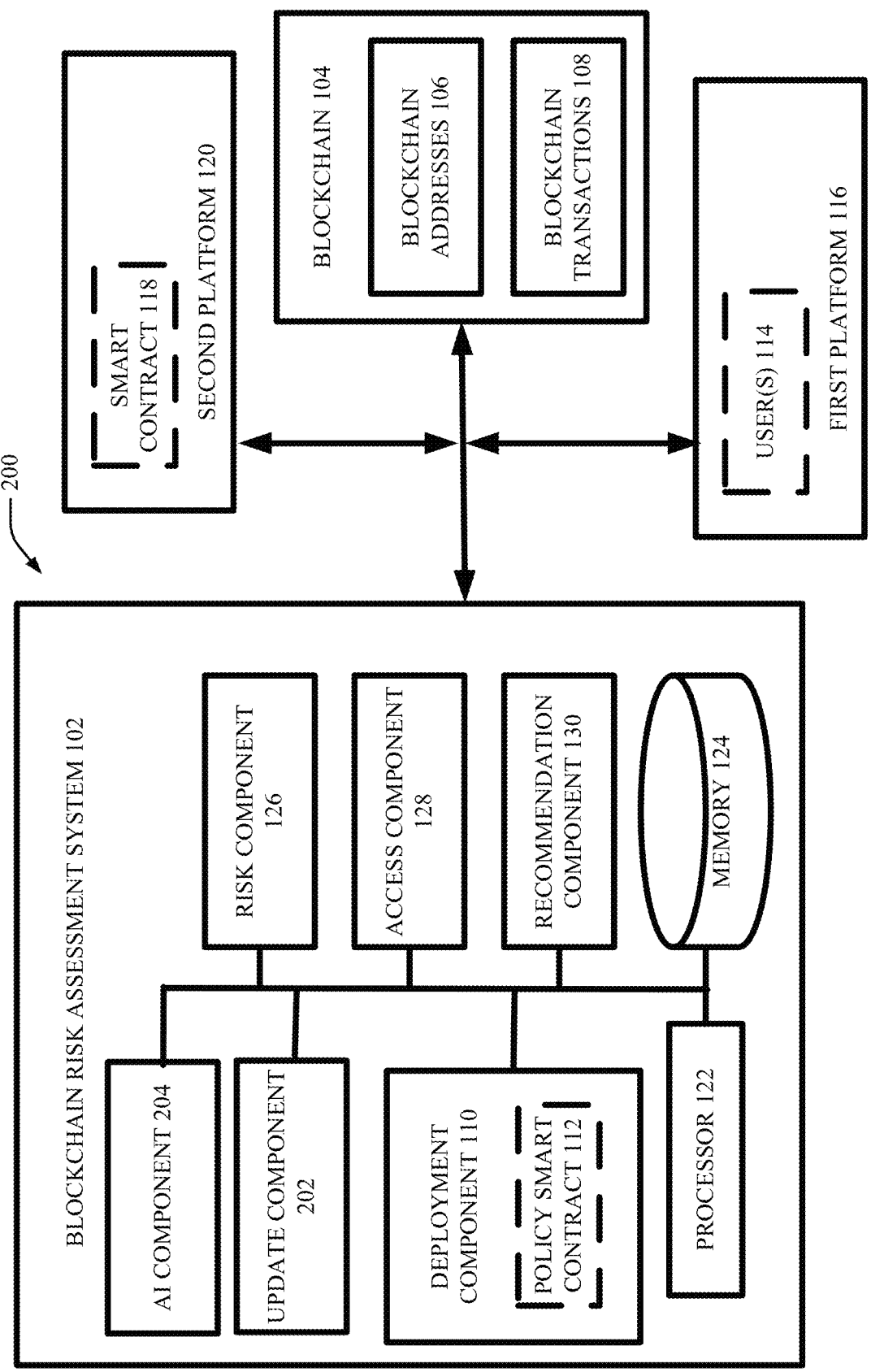
FIG. 2 illustrates a high-level block diagram of an example, non-limiting system that facilitates analyzing policies associated with a smart contract in accordance with one or more embodiments described herein.

FIG. 2 illustrates a high-level block diagram of an example, non-limiting system 200 including an update component 202 and an artificial intelligence (AI) component 204 that can facilitate smart contract risk assessment in accordance with one or more embodiments described herein. As shown, the system 200 can, in some cases, comprise the same components as the system 100, and can further description regarding like components is omitted for sake of brevity.

In various embodiments, the update component 202 can electronically build, construct, and/or otherwise create updates to the smart contract 118 that can facilitate lowering risk relative to at least the user(s) 114. The artificial intelligence (AI) component 204 can facilitate analyzing the smart contract 118, including utilizing machine learning techniques, that can utilize a model (explicitly or implicitly trained) to learn the smart contract and its policies, and facilitate generating updates that can improve the smart contract 118 and its policies, including risk associated therewith relative to at least the user(s) 114. The AI component 204, for example, can be trained on prior smart contracts and policies to learn good policies and bad policies, e.g., with respect to risk. The AI component 204 can in an embodiment build and continuously train a model that can facilitate assessing risk associated with smart contracts and respective policies. In an embodiment, a utility-based probabilistic-based analysis can be performed that factors risk and benefit associated with generated updates. The access component 128 and recommendation component 130 can likewise perform such utility-based analysis in connection with respective functionalities performed and automated actions taken.

In various embodiments, e.g., in connection with system 102 or system 200, the system 102, 200 can deploy, by the first platform (or first entity) 116 the policy smart contract 112 on the blockchain 104 to analyze the smart contract 118 deployed by the second platform (or second entity) 120, wherein the policy smart contract 112 is governed by a set of rules, wherein the policy smart contract 112 performs a first assessment that includes analyzing a set of functionalities of the smart contract 118 and detects a set of vulnerabilities associated with the smart contract 118 based on the set of rules. The risk component 126 determines at a first time a risk score corresponding to the smart contract 118 based on the analyzing and the detecting; and in response to determining that the risk score is above a threshold score, restricting the user(s) 114 of the first platform 116 corresponding to the first entity from accessing the smart contract 118.

In another embodiment, the AI component 204 can use a machine learning algorithm or model to generate one or more recommendations corresponding to the smart contract 118; and the recommendation component 130 can provide the one or more recommendations to the second platform (or second entity) 120.

In another embodiment, the AI component 204 can use a machine learning algorithm or model to generate one or more updates for the set of rules (or policies) based on analyzing a set of other smart contracts or a set of compromised features of the smart contract 118; and based on the analyzing, the update component 202 can automatically suggest updates or update the set of rules.

In yet another embodiment, the AI component 204 can use a machine learning algorithm or model to generate one or more updates for the set of rules based on analyzing a set of other smart contracts or a set of compromised features of the smart contract; and based on the analyzing, the recommendation component 130 can generate a notification regarding updating the set of rules.

In another embodiment, the update component 202 can update the set of rules associated with the smart contract 118, and the risk component 126 (optionally coordinating with the AI component 204) can re-assess at a second time the risk score, and if the risk score is below the threshold the access component 128 can re-establish access for the user(s) 114 of the first platform 116 corresponding to the first entity to the smart contract 118. For example, updates to respective clauses or security provisions, e.g., that mitigate risk to a user, can be provided.

In an aspect, detecting a set of vulnerabilities associated with the smart contract 118 based on the set of rules includes detecting one or more decentralized finance (DeFi) related vulnerabilities associated with the smart contract 118. It is to be appreciated that the second entity associated with the second platform 120 can be a decentralized finance (DeFi) entity.

DeFi is a blockchain-based form of finance that does not rely on central financial intermediaries such as brokerages, exchanges, or banks to offer traditional financial instruments, and instead utilizes smart contracts on blockchains, e.g., Ethereum. DeFi platforms facilitate people to lend or borrow funds from others, speculate on price movements on a range of assets using derivatives, trade cryptocurrencies, insure against risks, and earn interest in savings-like accounts. DeFi is centered around decentralized applications (DApps), that perform financial functions on distributed ledgers (blockchains). Rather than transactions being made through a centralized intermediary such as a cryptocurrency exchange or a traditional securities exchange on Wall Street, transactions are directly made between participants, mediated by smart contract programs.

These smart contract programs, or DeFi protocols, typically run using open-source software that is built and maintained by a community of developers. DApps are typically accessed through a Web3 enabled browser extension or application, such as MetaMask, which allows users to directly interact with a blockchain through a digital wallet. Coding errors and hacks are common in DeFi. Blockchain transactions are irreversible, which means that an incorrect or fraudulent transaction on a DeFi platform cannot be easily corrected. In year 2020, one platform known as Yam Finance quickly grew its deposits to $750 million before crashing days after launch due to a code error. Additionally, the code for the smart contracts that implement DeFi platforms is generally open-source software that can be easily copied to set up competing platforms, which creates instabilities as funds shift from platform to platform. The person or entity behind a DeFi protocol may be unknown, and may disappear with investors' money.

Accordingly, utilization of policy smart contracts to analyze policies of smart contracts, identify potential issues and risks associated with respective smart contracts can facilitate protecting users from entering into smart contracts that have risk levels above a desired threshold.

In another aspect, one or more assessments of the smart contract 118 can be performed at a first frequency by the policy smart contract 112. The operations can further involve updating the first frequency to a second frequency based on analyzing one or factors corresponding to the smart contract 118 or one or more factors corresponding to one or more other smart contracts. The operations can further include the system 102, 200 writing results of the analysis of the smart contract 118 to the blockchain 104. It is to be appreciated that the first entity or first platform 116 can be decentralized.

Figure 3:
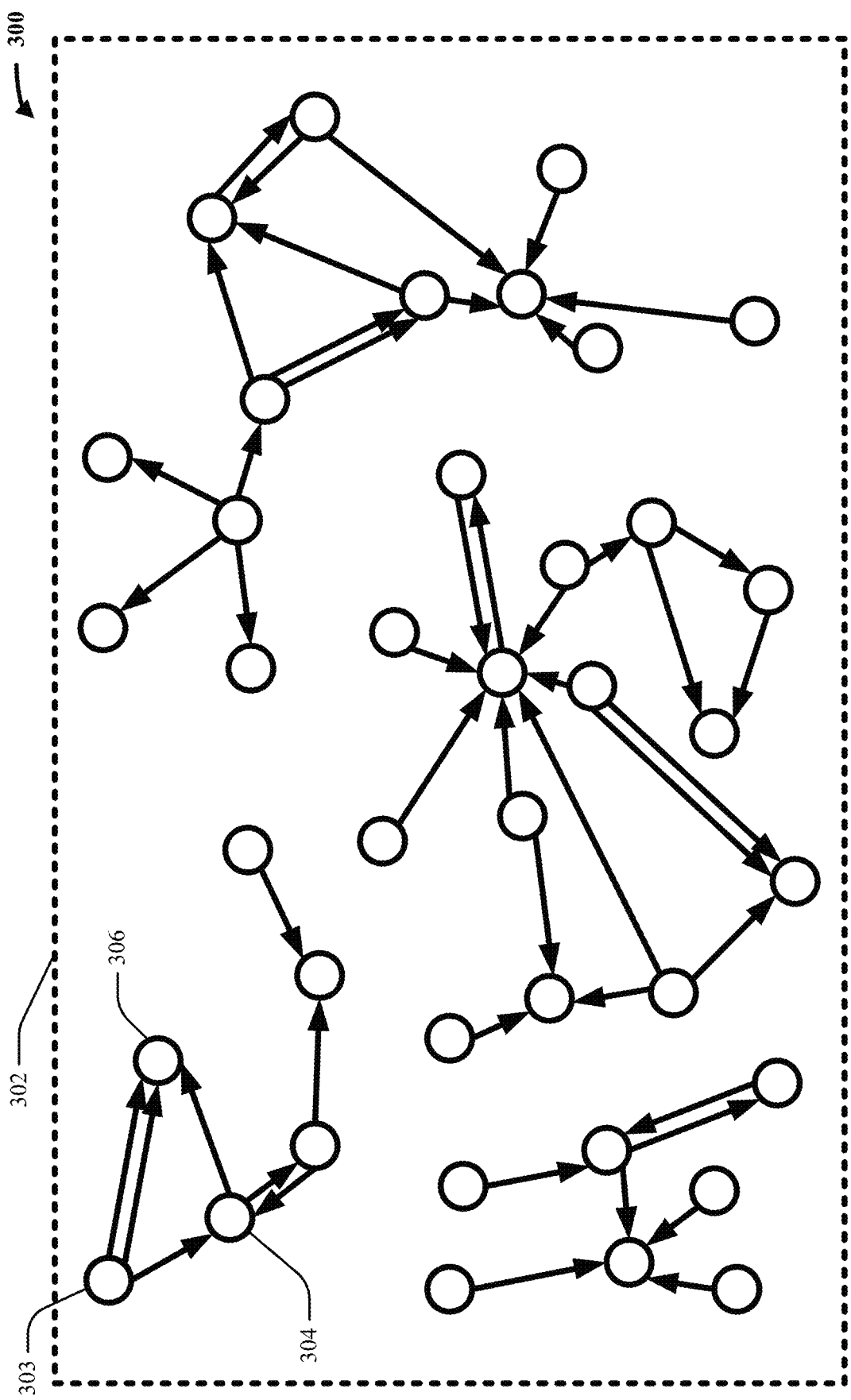
FIG. 3 illustrates a high-level block diagram of an example, non-limiting transaction graph in accordance with one or more embodiments described herein.

FIG. 3 illustrates a high-level block diagram of an example, non-limiting transaction graph in accordance with one or more embodiments described herein. In other words, FIG. 3 depicts an example, non-limiting embodiment of a transaction graph 302. Nodes of the transaction graph 302 can be represented by circles, and edges of the transaction graph 302 can be represented by arrows. The nodes of the transaction graph 302 can each respectively correspond to a set of blockchain addresses 106, and the edges of the transaction graph 302 can each respectively correspond to the set of blockchain transactions 108. That is, each node in the transaction graph 302 can represent a corresponding blockchain address, and each edge in the transaction graph 302 can represent a corresponding blockchain transaction between a pair of blockchain addresses. In various aspects, if an edge in the transaction graph 302 points away from a node in the transaction graph 302, this can indicate a blockchain transaction in which the blockchain address corresponding to the node transferred and/or paid cryptocurrency. Similarly, if an edge in the transaction graph 302 points toward a node in the transaction graph 302, this can indicate a blockchain transaction in which the blockchain address corresponding to the node received and/or was paid cryptocurrency.

In various aspects, the risk component 126 can generate risk scores based on executing any suitable machine learning algorithms on the transaction graph. In various cases, such risk scores can be leveraged to decide whether to engage in future blockchain transactions, associated with the smart contract 118, with various blockchain addresses. For instance, when given an opportunity to engage in a future blockchain transaction with a blockchain address or smart contract that has a high risk score (e.g., a risk score above any suitable threshold), access to the smart contract or blockchain address can be declined (e.g., the high risk score can indicate that the past behavior of the blockchain address or policies of the smart contract as recorded in the blockchain, is questionable and/or otherwise concerning). In contrast, when given an opportunity to engage in a future blockchain transaction with a blockchain address or smart contract that has a low risk score (e.g., a risk score below any suitable threshold), the opportunity can be accepted (e.g., the low risk score can indicate that the past behavior of the blockchain address or smart contract, as recorded in the blockchain, is not questionable and/or otherwise concerning).

Figure 4:
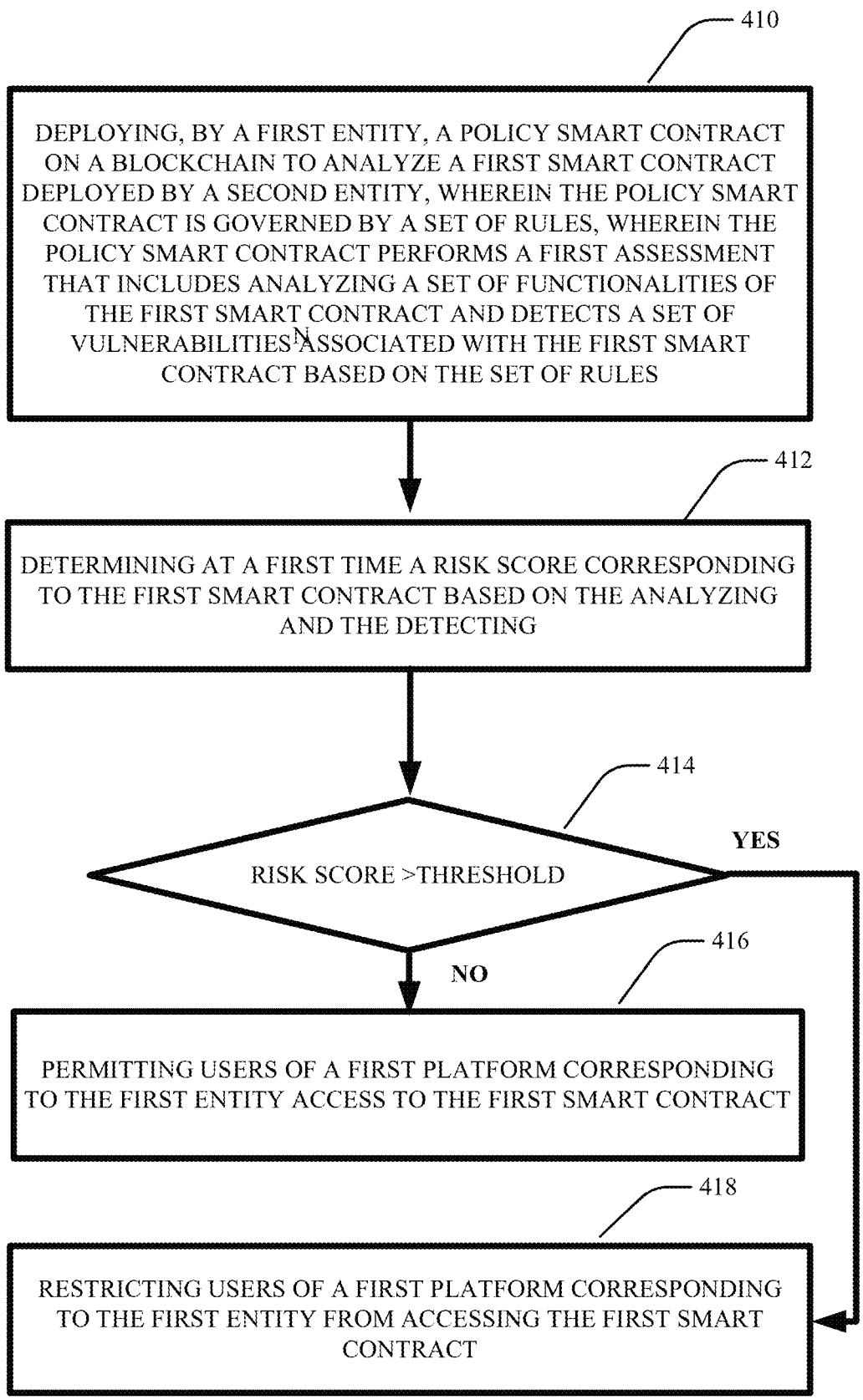
FIG. 4 illustrates a high-level flow diagram of an example, non-limiting computer-implemented method that facilitates analyzing smart contracts in accordance with one or more embodiments described herein.

FIG. 4 illustrates a high-level flow diagram of an example, non-limiting computer-implemented method 400 that can facilitate assessing risk associated with a first smart contract 128. It is to be appreciated that various methodologies described herein can be employed separately or in combination or sub-combination in accordance with respective embodiments. In various cases, the risk assessment system 102 can facilitate the computer-implemented method 400. In various embodiments, act 410 can include deploying, (e.g., using deployment component by a first entity), a policy smart contract on a blockchain to analyze a first smart contract deployed by a second entity, wherein the policy smart contract is governed by a set of rules, wherein the policy smart contract performs a first assessment that includes analyzing a set of functionalities of the first smart contract and detects a set of vulnerabilities associated with the first smart contract based on the set of rules. In various aspects, the policy smart contract can electronically read, parse, and/or decrypt the first smart contract and the blockchain, which can cause the policy smart contract to identify the set of blockchain addresses and/or the set of blockchain transactions and/or policies associated with the first smart contract.

At 412, a determination is made, at a first time, (e.g., using risk component 126) of a risk score corresponding to the first smart contract based on the analyzing and the detecting. A policy smart contract can be deployed that facilitates identifying potential vulnerabilities associated with the first smart contract. A first smart contract on a blockchain can be a set of actions implemented on contributing nodes, creating mutual agreement in results of such transactions without need for third-party mediation of information and money. In an example, parties negotiate and agree on conditions relating to a transaction. Once both parties' conditions for the exchange are fulfilled, a first smart contract is created, coded, and archived in a blockchain structure. Data is recorded and managed (e.g., through use of Internet of Things (IoT) devices such as RFID, quick-response codes, and WSNs). Once the first smart contract is created, goods and funds are transferred according to the terms of first smart contract. No human mediation is required, and the transaction can proceed faster, at less cost as compared to non-blockchain transactions.

As blockchain transactions and associated smart contracts become ubiquitous, the door is open to risk. Not every smart contract is equal from a risk perspective, and consequently there exists a need for systems and/or techniques that can electronically analyze a blockchain in order to estimate levels of risk associated with different policies associated with respective smart contracts. For example, an entity can create the first smart contract with terms or policies that are not secure, and a lay party could unwittingly agree to first smart contract terms that introduce risk, including fraud. A given trusted platform, e.g., a lending institution, may desire greater control over access by users of its platform to smart contracts. Innovations described and claimed herein relate to system(s) and method(s) that deploy policy smart contracts that analyze policies associated with respective smart contracts, and generates risk scores associated with respective smart contracts. If risk associated with a particular smart contract (e.g., risk score exceeds a threshold value), the system can restrict access of its users to the high-risk smart contract (e.g., first smart contract).

Embodiments described and claimed herein can analyze policies associated with the first smart contract, identify potential issues associated with the first smart contract relative to one or more parties, and suggest updates to the policies of the first smart contract, or even restrict access to one or more parties to the first smart contract. If recommended updates are made to the first smart contract, and a subsequent review or analysis of the policies deems the set of policies if now acceptable, e.g., risk score is below a threshold, access to the first smart contract by the one or more parties can be granted.

For example, a set of policies associated with the first smart contract may create uncertainty regarding whether protection is afford under the Uniform Commercial Code (UCC), Uniform Electronic Transactions Act (UETA), Electronic Signatures Recording Act (E-Sign Act), establishment of a security interest at state or federal level, insurance, security protocols, compliance, accreditations, terms, provisions, standards, protocols . . . , and other contractual provisions that increase or decrease risk associated with the contract. A policy smart contract deployed by a system in accordance with innovations described and claimed herein can facilitate identifying unacceptable or potentially problematic features, rules, triggers, terms, provisions, protocols, policies or the like (referred to herein as policies for sake of brevity) of the first smart contract, and as discussed above provide recommendations to update the policies, allow or restrict access to the first smart contract based on determined or inferred risk.

The risk component 126 can electronically calculate a risk score for the smart contract, e.g., based at least in part on one or more policies associated with the smart contract. In various instances, the risk component can employ a risk formula to compute such risk scores. In various cases, the risk formula can be any suitable mathematical function that takes as an argument level of importance of a given policy of the smart contract. In various aspects, the risk formula can also take as an argument any other suitable information pertaining to the smart contract (e.g., potential fraud, liability, security, financial exposure, unfavorable terms, compliance, regulatory issues . . . ). In various cases, the risk component can electronically transmit such risk scores to any suitable computing device (not shown), as desired. If at 414 the risk component determines that risk (e.g., risk score) of policies of the smart contract are above a risk threshold (e.g., high risk), the process proceeds to 418. At 418, users of a first platform corresponding to the first entity are restricted (e.g., via access component 128) from accessing the first smart contract. The access component can regulate access to the first smart contract by the user(s) of the first platform; if the risk score is above a threshold, the access component can restrict access by the user(s) to the first smart contract and/or the second platform, or if the risk score is below the threshold, the access component 128 can permit access by the user(s) 114 to the first smart contract and/or the second platform. If at 414, the risk score is below a threshold, the process proceeds to 416. At 416, users of a first platform corresponding to the first entity are permitted (e.g., via access component 128) access to the first smart contract. Accordingly, the first platform can mitigate risk to the users of the platform as well as to the platform itself by deploying a policy smart contract to facilitate identifying vulnerabilities with a first smart contract, assess level of risk associated with policies of the first smart contract and regulating access to the first smart contract by users of the first platform.

Furthermore, in one or more embodiments, a determination can be made at a second time (at a later time), (e.g., using risk component 126) of a risk score corresponding to the first smart contract based on the policy smart contract analyzing the first smart contract at the second time. The process described in FIG. 4 may be performed at the second time and based on the risk score, the access component may allow or restrict access to the first smart contract.

Figure 5:
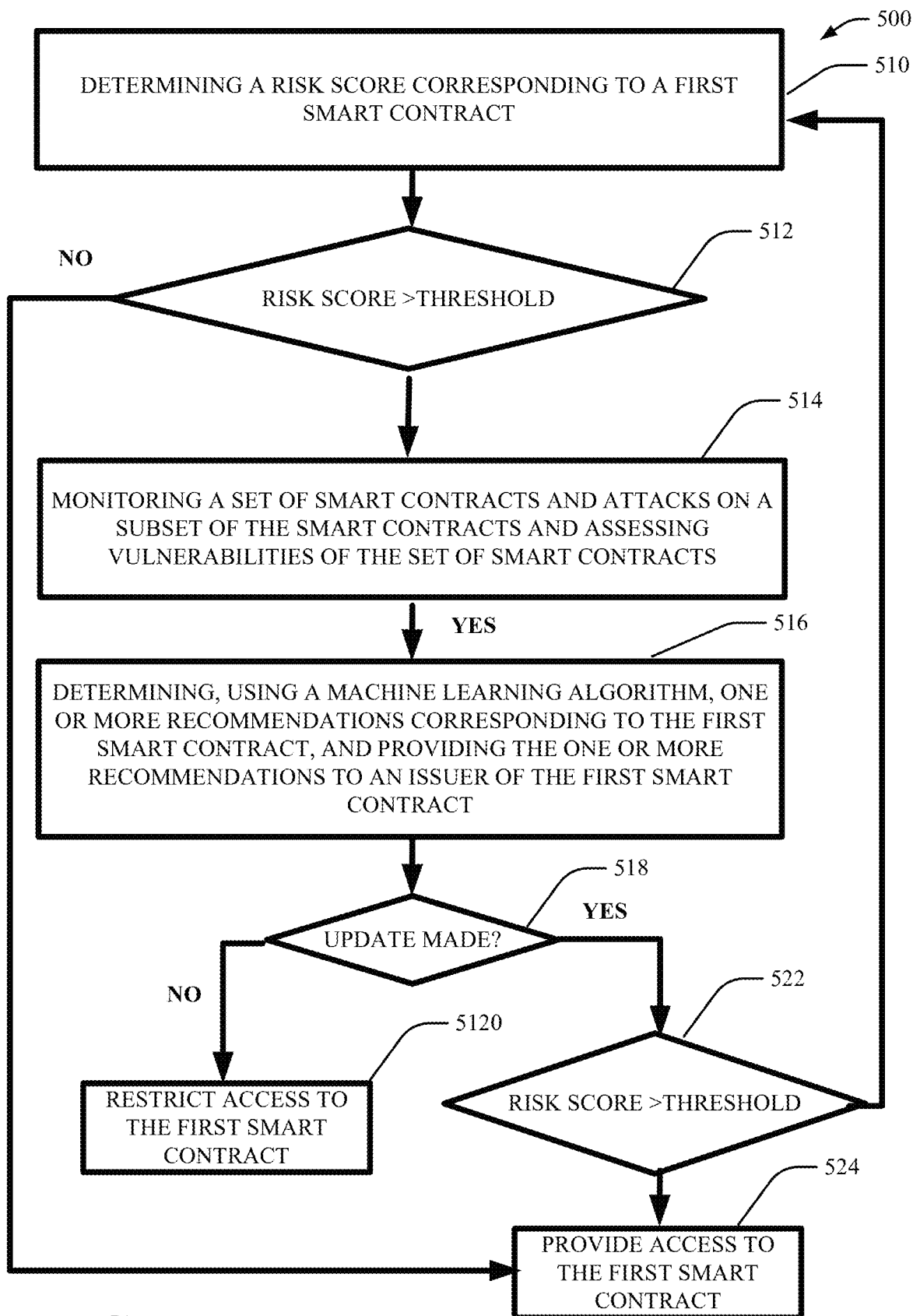
FIG. 5 illustrates a high-level flow diagram of an example, non-limiting computer-implemented sub-method that facilitates analyzing smart contracts in accordance with one or more embodiments described herein.

FIG. 5 illustrates a high-level flow diagram of an example, non-limiting computer-implemented method 500 that can facilitate assessing risk associated with a first smart contract. At 510, a risk score is determined (e.g., using risk component 126) corresponding to a first smart contract. The risk score for the first smart contract can be mathematically calculated and be a function of at least in part on one or more policies associated with the first smart contract. In various instances, a risk formula can compute such risk score. In various cases, the risk formula can be any suitable mathematical function that takes as an argument level of importance of a given policy of the first smart contract. In various aspects, the risk formula can also take as an argument any other suitable information pertaining to the first smart contract (e.g., potential fraud, liability, security, financial exposure, unfavorable terms, compliance, regulatory issues . . . ). At 512, if the risk score if below a threshold (e.g., the first smart contract is deemed to be acceptably safe), the process proceeds to 524 where access to the first smart contract is provided. If at 512, it is determined the risk score is above (or equal to) a threshold, the process proceeds to 514 where a set of smart contracts are monitored as well as attacks on a subset of the smart contracts and vulnerabilities of the set of smart contracts are assessed (e.g., by risk assessment system 102). As noted above, such assessment can be initiated by a deployment component that deploys a policy smart contract 112 to analyze attributes of respective smart contracts. At 516, a machine learning algorithm (e.g., recommendation component 130 and/or AI component 204) determines one or more recommendations to make corresponding to potential or actual issues with the first smart contract, and provides the one or more recommendations to an issuer of the first smart contract to mitigate or resolve the issues. For example, tighter security measure may be recommended, more protective contractual clauses added to the first smart contract, authentication or validation steps added as part of the contract, establishment or security interests, etc. At 518, a determination is made (e.g., by update component 202) regarding a recommended update being made. If no, the update has not been made, access to the first smart contract (e.g., by a user of a first platform) is restricted. If the update was made, at 522, at determination is made regarding a new risk score being below a threshold. If the new risk score is below a threshold (e.g., the updated first smart contract is low risk), at 524 access to the first smart contract (e.g., to the user of the first platform) is provided. If the new risk score is greater than the threshold, the process returns to 510. It is to be appreciated that determinations regarding potential updates can be made independent of risk threshold. For example, at 516 the machine learning algorithm can determine certain beneficial updates that can be made that improve functionality (e.g., speed of execution, execution volume, eliminating out of date policies, adding new functionalities or policies . . . ) of the first smart contract, independent of risk score, and such updates can be made at 518. In other words, it is to be appreciated that acts 516 and 518 can be performed in various embodiments independent of other acts.

Figure 6:
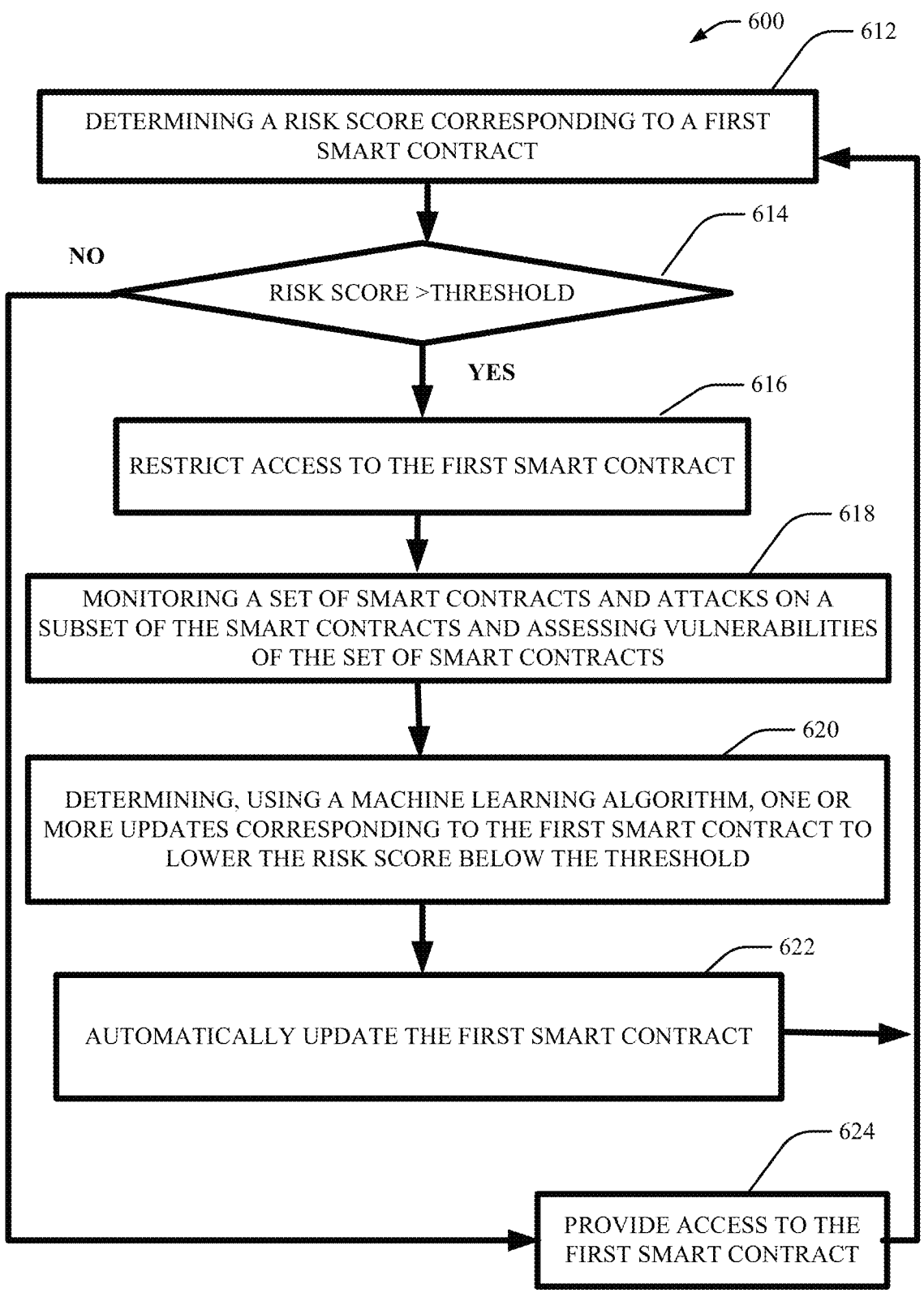
FIG. 6 illustrates a high-level flow diagram of an example, non-limiting computer-implemented sub-method that facilitates analyzing smart contracts in accordance with one or more embodiments described herein.

FIG. 6 illustrates a high-level flow diagram of an example, non-limiting computer-implemented method 600 that can facilitate mitigating risk associated with a first smart contract 128. At 612, a risk score is determined (e.g., using risk component 126) corresponding to a first smart contract. The risk score for the first smart contract can be mathematically calculated and be a function of at least in part on one or more policies associated with the first smart contract. In various instances, a risk formula can compute such risk score. In various cases, the risk formula can be any suitable mathematical function that takes as an argument level of importance of a given policy of the first smart contract. In various aspects, the risk formula can also take as an argument any other suitable information pertaining to the first smart contract (e.g., potential fraud, liability, security, financial exposure, unfavorable terms, compliance, regulatory issues . . . ). At 614, if the risk score if below a threshold (e.g., the first smart contract is deemed to be acceptably safe), the process proceeds to 624 where access to the first smart contract is provided. If at 614, it is determined the risk score is above (or equal to) a threshold, the process proceeds to 616 where a set of smart contracts are monitored as well as attacks on a subset of the smart contracts and vulnerabilities of the set of smart contracts are assessed (e.g., by risk assessment system 102). As noted above, such assessment can be initiated by a deployment component that deploys a policy smart contract 112 to analyze attributes of respective smart contracts. It is to be appreciated that an update can be initiated to the policy smart contract 112 based on a particular assessment of smart contracts; however, the policy smart contract can typically be continuously updated so as to reflect best policies at any given time. At 620, a machine learning algorithm (e.g., recommendation component 130 and/or AI component 204) determines one or more recommendations to make corresponding to potential or actual issues with the first smart contract, and provides the one or more recommendations to an issuer of the first smart contract to mitigate or resolve the issues. The machine learning algorithm can for example leverage and update a model that has learned best practices/terms/policies for various types of smart contracts, and can determine suitable updates based on such learning to improve robustness of smart contracts under assessment. Likewise, the machine learning algorithm can leverage the model and respective learning to facilitate identifying vulnerabilities learned from prior smart contract assessments. For example, tighter security measure may be recommended, more protective contractual clauses added to the first smart contract, authentication or validation steps added as part of the contract, establishment or security interests, etc. At 622, the first smart contract is automatically updated (e.g., via update component 202) to address perceived defects, vulnerabilities or undesirable aspects of policies or functionalities associated with the first contract. For example, security provisions can be tightened, contractual provisions revised, execution steps modified, protocols updated, etc. In general, the automatic updates are made to facilitate the first smart contract becoming acceptable for engagement by respective users of a first platform. The updates facilitate protecting the respective users and/or the first platform. Such methodology, facilitates dynamically remaining robust as to identifying new threats associated with smart contracts.

It is to be appreciated that determinations regarding potential updates can be made independent of risk threshold. For example, at 620 the machine learning algorithm can determine certain beneficial updates that can be made that improve functionality (e.g., speed of execution, execution volume, eliminating out of date policies, adding new functionalities or policies . . . ) of the first smart contract, independent of risk score, and such updates can be made at 622. In other words, it is to be appreciated that acts 620 and 622 can be performed in various embodiments independent of other acts.

Figure 7:
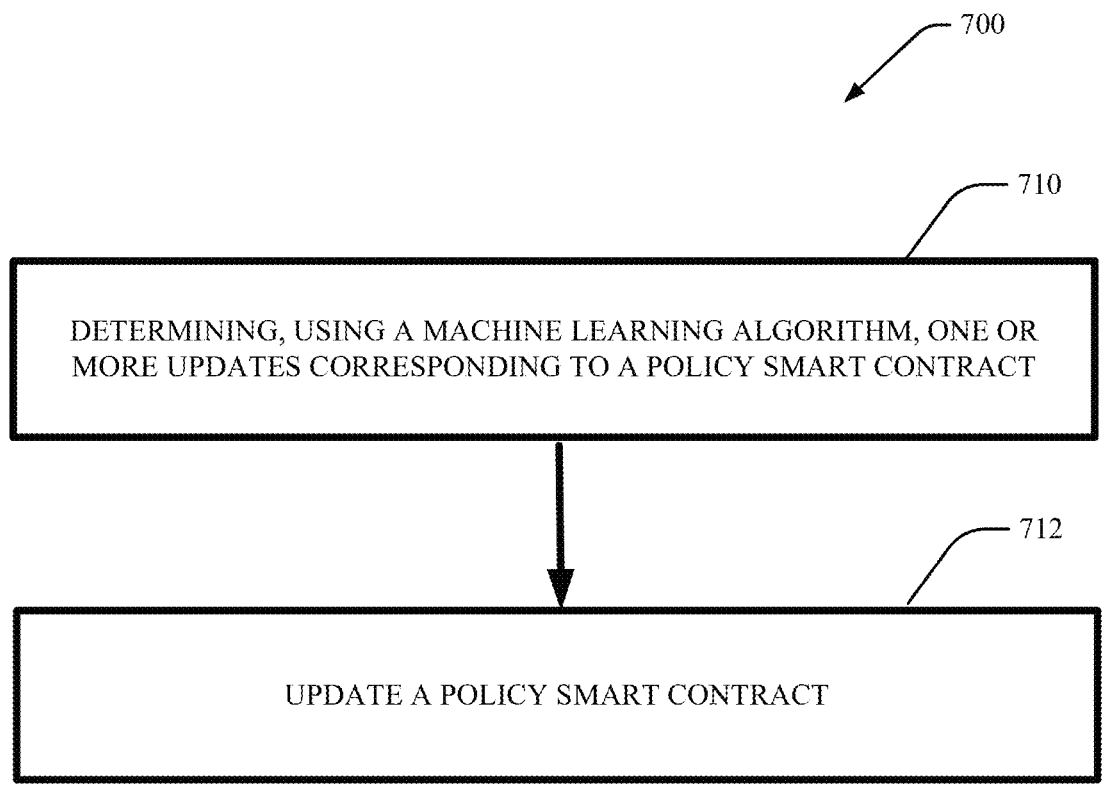
FIG. 7 illustrates a high-level flow diagram of an example, non-limiting computer-implemented sub-method that facilitates analyzing and updating policy smart contracts in accordance with one or more embodiments described herein.

FIG. 7 illustrates a high-level flow diagram of an example, non-limiting computer-implemented method 700 that can facilitate updating a policy smart contract 112. At 710, a machine learning algorithm (e.g., recommendation component 130 and/or AI component 204) determines one or more recommendations to make to a policy first smart contract. The determination, for example, can be based on analyzing other policy smart contracts, respective smart contracts, system or networks, etc. The machine learning algorithm can for example leverage and update a model that has learned best practices/terms/policies for various types of policy smart contracts, and can determine suitable updates based on such learning to improve robustness of policy smart contracts under assessment. Likewise, the machine learning algorithm can leverage the model and respective learning to facilitate identifying vulnerabilities learned from prior policy smart contract and/or smart contract assessments. For example, tighter security measure may be desired, more protective contractual clauses required for smart contract(s) evaluated by the policy smart contract, authentication or validation steps added as part of the contract, establishment or security interests, etc. At 712, a policy smart contract is updated (e.g., via update component 202). As noted, the policy smart contract can identify vulnerabilities or undesirable aspects or features of a first smart contract. The machine learning algorithm can learn to identify respective issues associated with respective smart contracts. Accordingly, such learning can be encoded in an explicitly and/or implicitly trained artificial-intelligence-based model, and such model can facilitate updating the policy smart contract to improve detecting of vulnerabilities or undesirable aspects or features of respective smart contracts. It is to be appreciated that in certain embodiments, the policy smart contract can be automatically updated (e.g., via update component 202), and in other embodiments such updates may include providing recommendations for implementation of one or more updates corresponding to the policy smart contract. In addition, based on an update being made to the policy smart contract, the policy smart contract may analyze one or more smart contracts, such as the first smart contract referred to in FIG. 4, according to the updated rules/policies of the policy smart contract. Furthermore, the steps described in FIG. 4 may be performed using the updated rules/policies of the policy smart contract and a determination may be made as to whether or not to allow or restrict access to the first smart contract based on a determined risk score (as described in FIG. 4). In one or more embodiments, the process as described in FIG. 4 may be triggered based on an update being made on the policy smart contract.

To facilitate some of the above-described machine learning aspects of various embodiments of the subject innovation, consider the following discussion of artificial intelligence (AI). Various embodiments of the present innovation herein can employ artificial intelligence to facilitate automating one or more features of the present innovation. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) of the present innovation, components of the present innovation can examine the entirety or a subset of the data to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z_1, z_2, z_3, z_4, z_n)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

Those having ordinary skill in the art will appreciate that the herein disclosure describes non-limiting examples of various embodiments of the subject innovation. For ease of description and/or explanation, various portions of the herein disclosure utilize the term "each" when discussing various embodiments of the subject innovation. Those having ordinary skill in the art will appreciate that such usages of the term "each" are non-limiting examples. In other words, when the herein disclosure provides a description that is applied to "each" of some particular computerized object and/or component, it should be understood that this is a non-limiting example of various embodiments of the subject innovation, and it should be further understood that, in various other embodiments of the subject innovation, it can be the case that such description applies to fewer than "each" of that particular computerized object.

Figure 8:
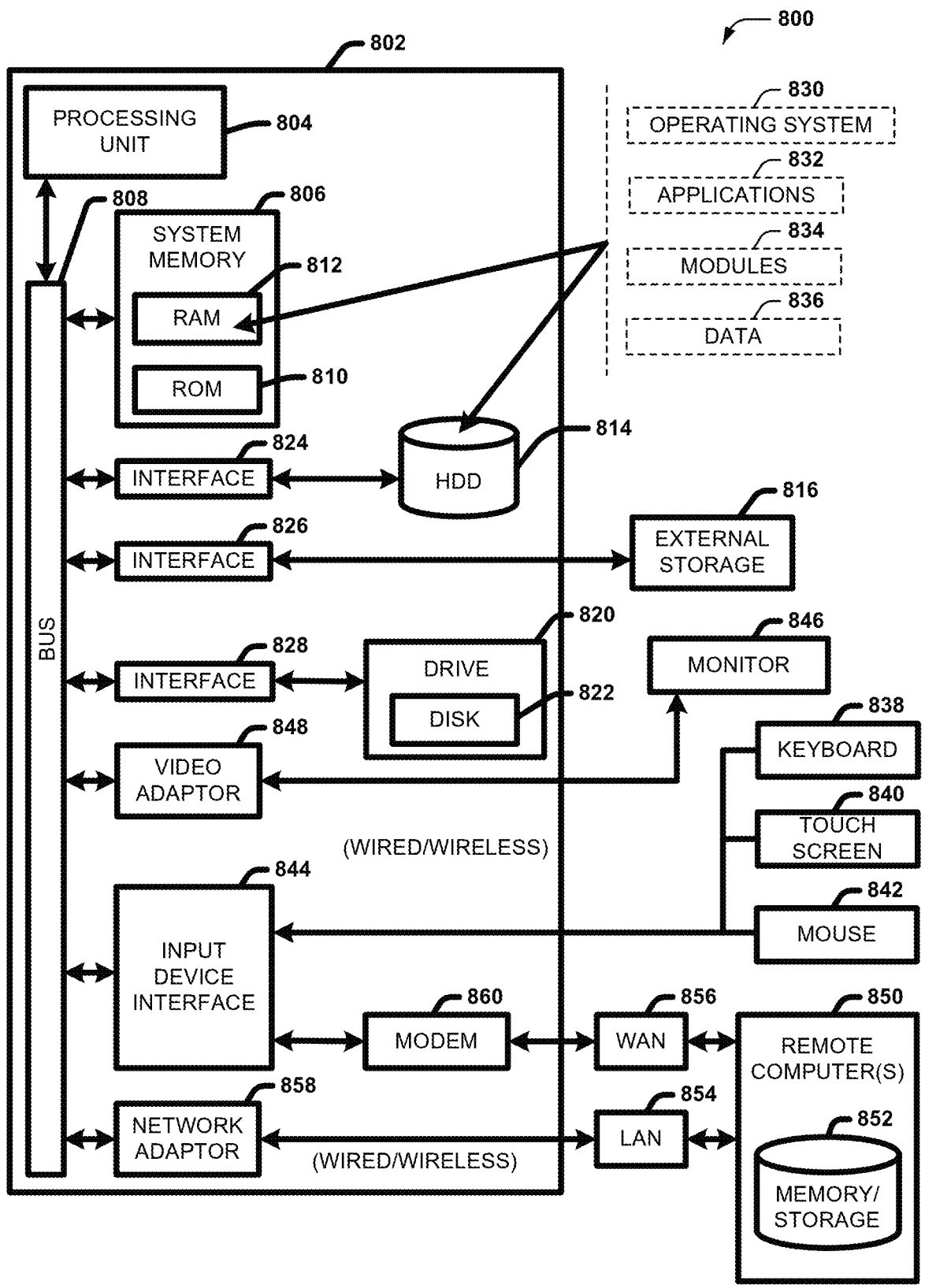
FIG. 8 illustrates a block diagram of an example, non-limiting operating environment in which one or more embodiments described herein can be facilitated.

In order to provide additional context for various embodiments described herein, FIG. 8 and the following discussion are intended to provide a brief, general description of a suitable computing environment 800 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices. A component or module can be software, hardware, or a combination thereof.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 8, the example environment 800 for implementing various embodiments of the aspects described herein includes a computer 802, the computer 802 including a processing unit 804, a system memory 806 and a system bus 808. The system bus 808 couples system components including, but not limited to, the system memory 806 to the processing unit 804. The processing unit 804 can be any of various commercially available processors. Dual microprocessors and other multi-processor architectures can also be employed as the processing unit 804.

The system bus 808 can be any of several types of bus structure that can further interconnect to a memory bus (with or without a memory controller), a peripheral bus, and a local bus using any of a variety of commercially available bus architectures. The system memory 806 includes ROM 810 and RAM 812. A basic input/output system (BIOS) can be stored in a non-volatile memory such as ROM, erasable programmable read only memory (EPROM), EEPROM, which BIOS contains the basic routines that help to transfer information between elements within the computer 802, such as during startup. The RAM 812 can also include a high-speed RAM such as static RAM for caching data.

The computer 802 further includes an internal hard disk drive (HDD) 814 (e.g., EIDE, SATA), one or more external storage devices 816 (e.g., a magnetic floppy disk drive (FDD) 816, a memory stick or flash drive reader, a memory card reader, etc.) and a drive 820, e.g., such as a solid state drive, an optical disk drive, which can read or write from a disk 822, such as a CD-ROM disc, a DVD, a BD, etc. Alternatively, where a solid state drive is involved, disk 822 would not be included, unless separate. While the internal HDD 814 is illustrated as located within the computer 802, the internal HDD 814 can also be configured for external use in a suitable chassis (not shown). Additionally, while not shown in environment 800, a solid state drive (SSD) could be used in addition to, or in place of, an HDD 814. The HDD 814, external storage device(s) 816 and drive 820 can be connected to the system bus 808 by an HDD interface 824, an external storage interface 826 and a drive interface 828, respectively. The interface 824 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 802, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 812, including an operating system 830, one or more application programs 832, other program modules 834 and program data 836. All or portions of the operating system, applications, modules, and/or data can also be cached in the RAM 812. The systems and methods described herein can be implemented utilizing various commercially available operating systems or combinations of operating systems.

Computer 802 can optionally comprise emulation technologies. For example, a hypervisor (not shown) or other intermediary can emulate a hardware environment for operating system 830, and the emulated hardware can optionally be different from the hardware illustrated in FIG. 8. In such an embodiment, operating system 830 can comprise one virtual machine (VM) of multiple VMs hosted at computer 802. Furthermore, operating system 830 can provide runtime environments, such as the Java runtime environment or the .NET framework, for applications 832. Runtime environments are consistent execution environments that allow applications 832 to run on any operating system that includes the runtime environment. Similarly, operating system 830 can support containers, and applications 832 can be in the form of containers, which are lightweight, standalone, executable packages of software that include, e.g., code, runtime, system tools, system libraries and settings for an application.

Further, computer 802 can be enable with a security module, such as a trusted processing module (TPM). For instance, with a TPM, boot components hash next in time boot components, and wait for a match of results to secured values, before loading a next boot component. This process can take place at any layer in the code execution stack of computer 802, e.g., applied at the application execution level or at the operating system (OS) kernel level, thereby enabling security at any level of code execution.

A user can enter commands and information into the computer 802 through one or more wired/wireless input devices, e.g., a keyboard 838, a touch screen 840, and a pointing device, such as a mouse 842. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 804 through an input device interface 844 that can be coupled to the system bus 808, but can be connected by other interfaces, such as a parallel port, an IEEE 1394 serial port, a game port, a USB port, an IR interface, a BLUETOOTH® interface, etc.

A monitor 846 or other type of display device can be also connected to the system bus 808 via an interface, such as a video adapter 848. In addition to the monitor 846, a computer typically includes other peripheral output devices (not shown), such as speakers, printers, etc.

The computer 802 can operate in a networked environment using logical connections via wired and/or wireless communications to one or more remote computers, such as a remote computer(s) 850. The remote computer(s) 850 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 852 is illustrated. The logical connections depicted include wired/wireless connectivity to a local area network (LAN) 854 and/or larger networks, e.g., a wide area network (WAN) 856. Such LAN and WAN networking environments are commonplace in offices and companies, and facilitate enterprise-wide computer networks, such as intranets, all of which can connect to a global communications network, e.g., the Internet.

When used in a LAN networking environment, the computer 802 can be connected to the local network 854 through a wired and/or wireless communication network interface or adapter 858. The adapter 858 can facilitate wired or wireless communication to the LAN 854, which can also include a wireless access point (AP) disposed thereon for communicating with the adapter 858 in a wireless mode.

When used in a WAN networking environment, the computer 802 can include a modem 860 or can be connected to a communications server on the WAN 856 via other means for establishing communications over the WAN 856, such as by way of the Internet. The modem 860, which can be internal or external and a wired or wireless device, can be connected to the system bus 808 via the input device interface 844. In a networked environment, program modules depicted relative to the computer 802 or portions thereof, can be stored in the remote memory/storage device 852. It will be appreciated that the network connections shown are example and other means of establishing a communications link between the computers can be used.

When used in either a LAN or WAN networking environment, the computer 802 can access cloud storage systems or other network-based storage systems in addition to, or in place of, external storage devices 816 as described above, such as but not limited to a network virtual machine providing one or more aspects of storage or processing of information. Generally, a connection between the computer 802 and a cloud storage system can be established over a LAN 854 or WAN 856 e.g., by the adapter 858 or modem 860, respectively. Upon connecting the computer 802 to an associated cloud storage system, the external storage interface 826 can, with the aid of the adapter 858 and/or modem 860, manage storage provided by the cloud storage system as it would other types of external storage. For instance, the external storage interface 826 can be configured to provide access to cloud storage sources as if those sources were physically connected to the computer 802.

The computer 802 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 9:
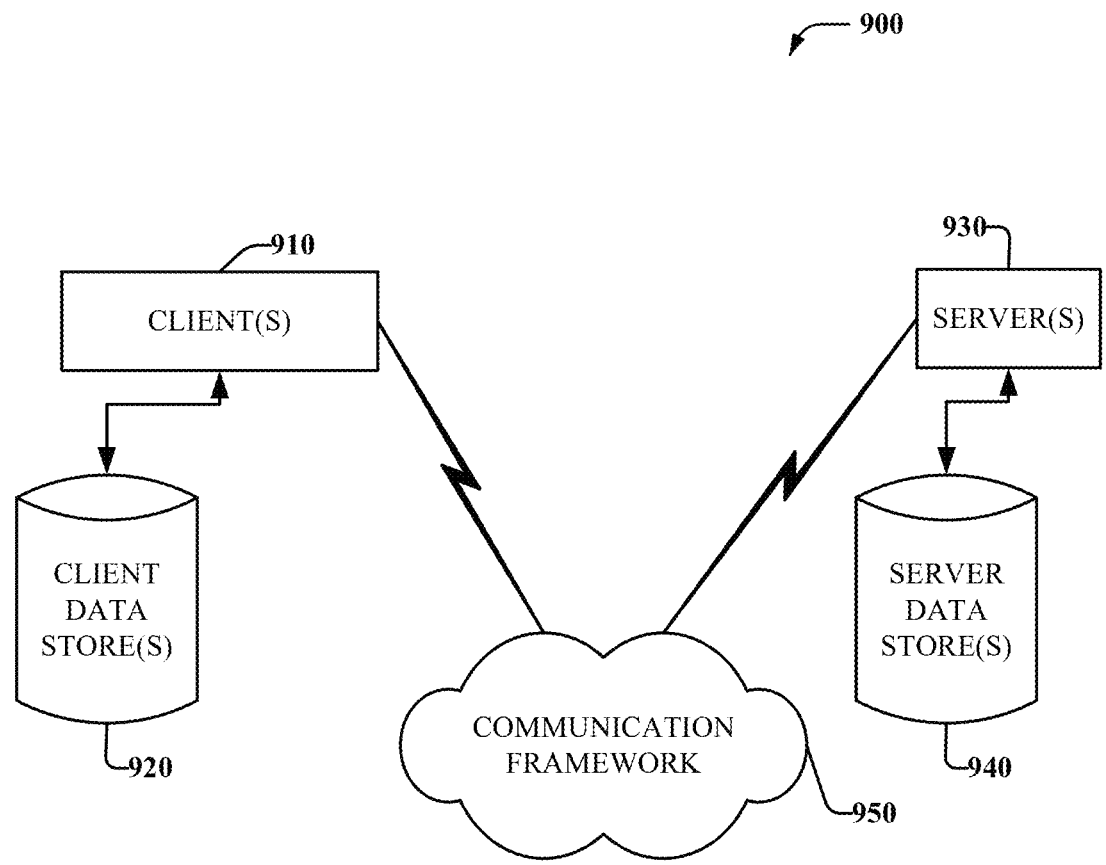
FIG. 9 illustrates an example networking environment operable to execute various implementations described herein.

FIG. 9 is a schematic block diagram of a sample computing environment 900 with which the disclosed subject matter can interact. The sample computing environment 900 includes one or more client(s) 910. The client(s) 910 can be hardware and/or software (e.g., threads, processes, computing devices). The sample computing environment 900 also includes one or more server(s) 930. The server(s) 930 can also be hardware and/or software (e.g., threads, processes, computing devices). The servers 930 can house threads to perform transformations by employing one or more embodiments as described herein, for example. One possible communication between a client 910 and a server 930 can be in the form of a data packet adapted to be transmitted between two or more computer processes. The sample computing environment 900 includes a communication framework 950 that can be employed to facilitate communications between the client(s) 910 and the server(s) 930. The client(s) 910 are operably connected to one or more client data store(s) 920 that can be employed to store information local to the client(s) 910. Similarly, the server(s) 930 are operably connected to one or more server data store(s) 940 that can be employed to store information local to the servers 930.

In its broadest sense, blockchain refers to a framework that supports a trusted ledger that is stored, maintained, and updated in a distributed manner in a peer-to-peer network. For example, in a cryptocurrency application, such as Bitcoin or Ethereum, Ripple, Dash, Litecoin, Dogecoin, zCash, Tether, Bitcoin Cash, Cardano, Stellar, EOS, NEO, NEM, Bitshares, Decred, Augur, Komodo, PIVX, Waves, Steem, Monero, Golem, Stratis, Bytecoin, Ardor, or in digital currency exchanges, such as Coinbase, Kraken, CEX.IO, Shapeshift, Poloniex, Bitstamp, Coinmama, Bisq, LocalBitcoins, Gemini and others the distributed ledger represents each transaction where units of the cryptocurrency are transferred between entities. For example, using a digital currency exchange, a user may buy any value of digital currency or exchange any holdings in digital currencies into worldwide currency or other digital currencies. Each transaction can be verified by the distributed ledger and only verified transactions are added to the ledger. The ledger, along with many aspects of blockchain, may be referred to as "decentralized" in that a central authority is typically not present. Because of this, the accuracy and integrity of the ledger cannot be attacked at a single, central location. Modifying the ledger at all, or a majority of, locations where it is stored is made difficult so as to protect the integrity of the ledger. This is due in large part because individuals associated with the nodes that make up the peer-to-peer network have a vested interest in the accuracy of the ledger.

Though maintaining cryptocurrency transactions in the distributed ledger may be the most recognizable use of blockchain technology today, the ledger may be used in a variety of different fields. Indeed, blockchain technology is applicable to any application where data of any type may be accessed where the accuracy of the data is assured. For example, a supply chain may be maintained in a blockchain ledger, where the transfer of each component from party to party, and location to location, may be recorded in the ledger for later retrieval. Doing so allows for easier identification of a source for a defective part and where other such defective parts have been delivered. Similarly, food items may be tracked in like manner from farm to grocery store to purchaser.

Implementations of the present disclosure will now be described in detail with reference to the accompanying Figures.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Computing Architecture

Figure 10:
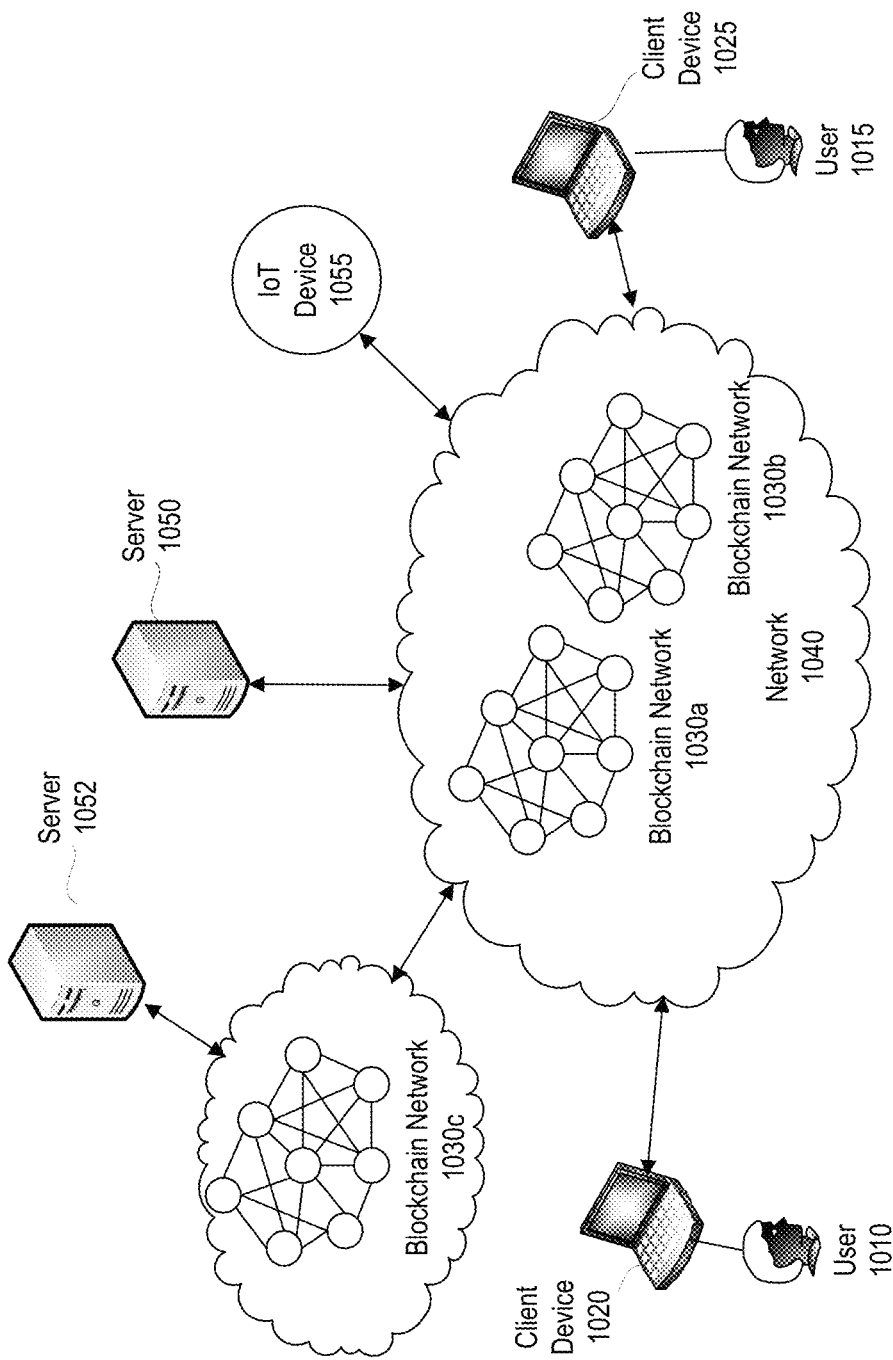
FIG. 10 illustrates an example computing architecture for facilitating one or more blockchain based transactions.

As discussed above, the distributed ledger in a blockchain framework is stored, maintained, and updated in a peer-topeer network. In one example the distributed ledger maintains a number of blockchain transactions. FIG. 10 shows an example system 1000 for facilitating a blockchain transaction. The system 1000 includes a first client device 1020, a second client device 1025, a first server 1050, and an Internet of Things (IoT) device 1055 interconnected via a network 1040. The first client device 1020, the second client device 1025, the first server 1050 may be a computing device. The IoT device 1055 may comprise any of a variety of devices including vehicles, home appliances, embedded electronics, software, sensors, actuators, thermostats, light bulbs, door locks, refrigerators, RFID implants, RFID tags, pacemakers, wearable devices, smart home devices, cameras, trackers, pumps, POS devices, and stationary and mobile communication devices along with connectivity hardware configured to connect and exchange data. The network 1040 may be any of a variety of available networks, such as the Internet, and represents a worldwide collection of networks and gateways to support communications between devices connected to the network 1040. The system 1000 may also comprise one or more distributed or peer-to-peer (P2P) networks, such as a first, second, and third blockchain network 1030a-c (generally referred to as blockchain networks 1030). As shown in FIG. 10, the network 1040 may comprise the first and second blockchain networks 1030a and 1030b. The third blockchain network 1030c may be associated with a private blockchain as described below with reference to FIG. 10, and is thus, shown separately from the first and second blockchain networks 1030a and 1030b. Each blockchain network 1030 may comprise a plurality of interconnected devices (or nodes) as described in more detail with reference to FIG. 10. As discussed above, a ledger, or blockchain, is a distributed database for maintaining a growing list of records comprising any type of information. A blockchain, as described in more detail with reference to FIG. 10, may be stored at least at multiple nodes (or devices) of the one or more blockchain networks 1030.

In one example, a blockchain based transaction may generally involve a transfer of data or value between entities, such as the first user 1010 of the first client device 1020 and the second user 1015 of the second client device 1025 in FIG. 10. The server 1050 may include one or more applications, for example, a transaction application configured to facilitate the transaction between the entities by utilizing a blockchain associated with one of the blockchain networks 1030. As an example, the first user 1010 may request or initiate a transaction with the second user 1015 via a user application executing on the first client device 1020. The transaction may be related to a transfer of value or data from the first user 1010 to the second user 1015. The first client device 1020 may send a request of the transaction to the server 1050. The server 1050 may send the requested transaction to one of the blockchain networks 1030 to be validated and approved as discussed below.

Blockchain Network

Figure 11:
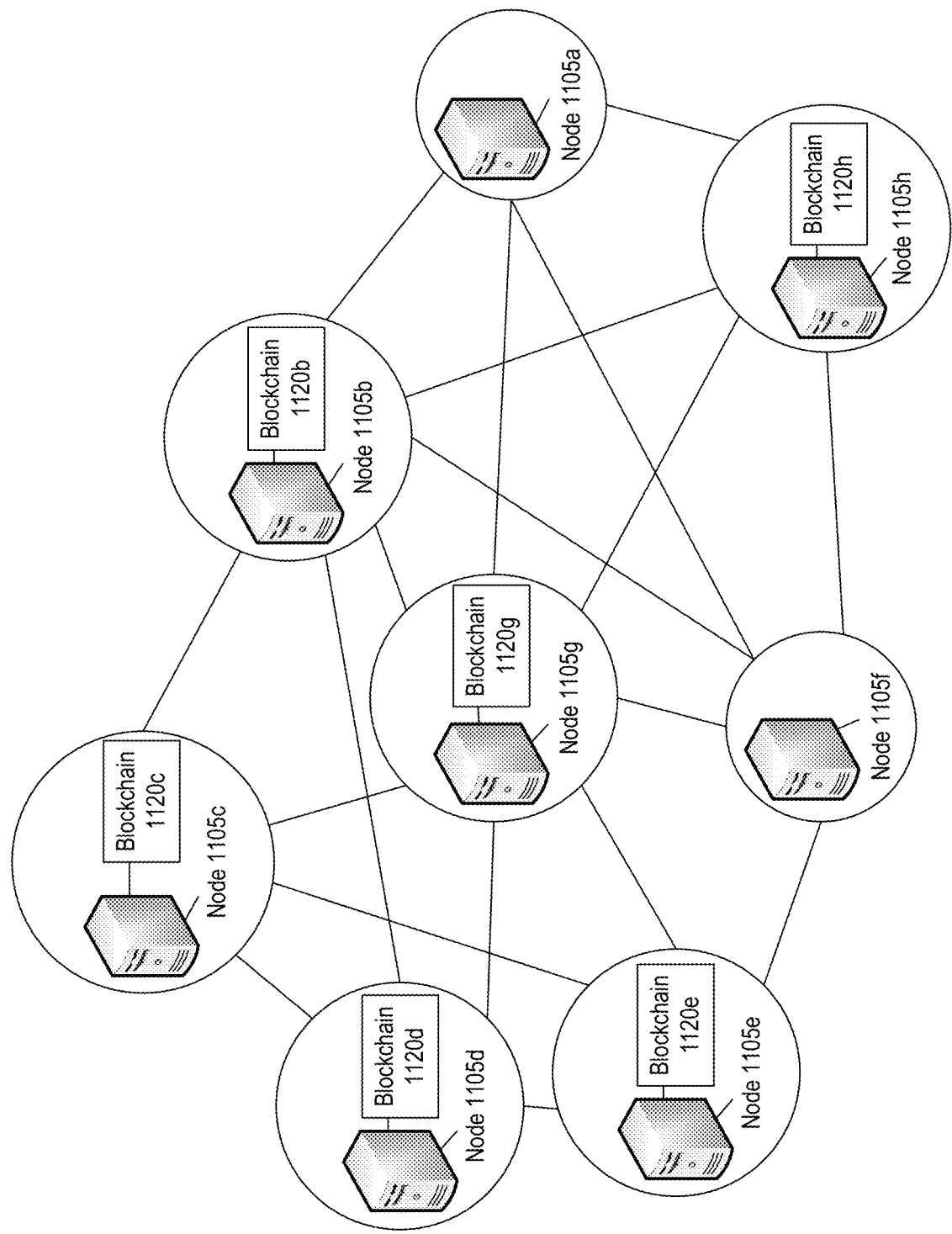
FIG. 11 illustrates an example blockchain network.

FIG. 11 shows an example blockchain network 1100 comprising a plurality of interconnected nodes or devices 1105a-h (generally referred to as nodes 1105). Each of the nodes 1105 may comprise a computing device. Although FIG. 11 shows a single device 1105, each of the nodes 1105 may comprise a plurality of devices (e.g., a pool). The blockchain network 1100 may be associated with a blockchain 1120. Some or all of the nodes 1105 may replicate and save an identical copy of the blockchain 1120. For example, FIG. 11 shows that the nodes 1105b-e and 1105h-h store copies of the blockchain 1120. The nodes 1105b-e and 1105h-h may independently update their respective copies of the blockchain 1120 as discussed below.

Blockchain Node Types

Blockchain nodes, for example, the nodes 1105, may be full nodes or lightweight nodes. Full nodes, such as the nodes 1105b-e and 1105h-h, may act as a server in the blockchain network 1100 by storing a copy of the entire blockchain 1120 and ensuring that transactions posted to the blockchain 1120 are valid. The full nodes 1105b-e and 1105h-h may publish new blocks on the blockchain 1120. Lightweight nodes, such as the nodes 1105a and 1105f, may have fewer computing resources than full nodes. For example, IoT devices often act as lightweight nodes. The lightweight nodes may communicate with other nodes 1105, provide the full nodes 1105b-e and 1105h-h with information, and query the status of a block of the blockchain 1120 stored by the full nodes 1105b-e and 1105h-h. In this example, however, as shown in FIG. 11, the lightweight nodes 1105a and 1105f may not store a copy of the blockchain 1120 and thus, may not publish new blocks on the blockchain 1120.

Blockchain Network Types

The blockchain network 1100 and its associated blockchain 1120 may be public (permissionless), federated or consortium, or private. If the blockchain network 1100 is public, then any entity may read and write to the associated blockchain 1120. However, the blockchain network 1100 and its associated blockchain 1120 may be federated or consortium if controlled by a single entity or organization. Further, any of the nodes 1105 with access to the Internet may be restricted from participating in the verification of transactions on the blockchain 1120. The blockchain network 1100 and its associated blockchain 1120 may be private (permissioned) if access to the blockchain network 1100 and the blockchain 1120 is restricted to specific authorized entities, for example organizations or groups of individuals. Moreover, read permissions for the blockchain 1120 may be public or restricted while write permissions may be restricted to a controlling or authorized entity.

Blockchain

Figure 12:
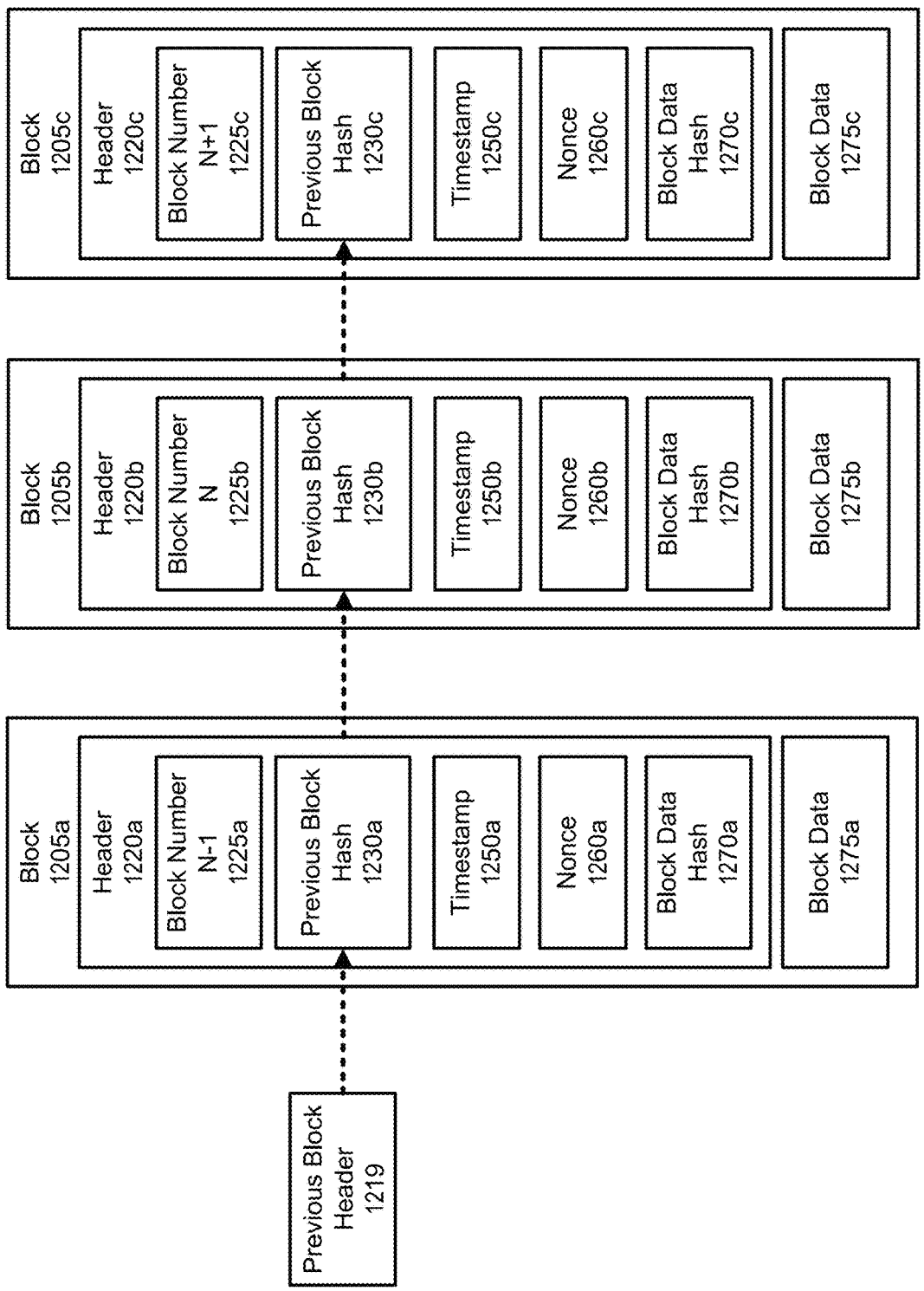
FIG. 12 illustrates an example blockchain.

As discussed above, a blockchain 1120 may be associated with a blockchain network 1100. FIG. 12 shows an example blockchain 1200. The blockchain 1200 may comprise a plurality of blocks 1205a, 1205b, and 1205c (generally referred to as blocks 1205). The blockchain 1200 comprises a first block (not shown), sometimes referred to as the genesis block. Each of the blocks 1205 may comprise a record of one or a plurality of submitted and validated transactions. The blocks 1205 of the blockchain 1200 may be linked together and cryptographically secured. In some cases, the post-quantum cryptographic algorithms that dynamically vary over time may be utilized to mitigate ability of quantum computing to break present cryptographic schemes. Examples of the various types of data fields stored in a blockchain block are provided below. A copy of the blockchain 1200 may be stored locally, in the cloud, on grid, for example by the nodes 1105b-e and 1105h-h, as a file or in a database.

Blocks

Each of the blocks 1205 may comprise one or more data fields. The organization of the blocks 1205 within the blockchain 1200 and the corresponding data fields may be implementation specific. As an example, the blocks 1205 may comprise a respective header 1220a, 1220b, and 1220c (generally referred to as headers 1220) and block data 1275a, 1275b, and 1275c (generally referred to as block data 1275). The headers 1220 may comprise metadata associated with their respective blocks 1205. For example, the headers 1220 may comprise a respective block number 1225a, 1225b, and 1225c. As shown in FIG. 12, the block number 1225a of the block 1205a is N−1, the block number 1225b of the block 1205b is N, and the block number 1225c of the block 1205c is N+1. The headers 1220 of the blocks 1205 may include a data field comprising a block size (not shown).

The blocks 1205 may be linked together and cryptographically secured. For example, the header 1220b of the block N (block 1205b) includes a data field (previous block hash 1230b) comprising a hash representation of the previous block N−1's header 1220a. The hashing algorithm utilized for generating the hash representation may be, for example, a secure hashing algorithm 256 (SHA-256) which results in an output of a fixed length. In this example, the hashing algorithm is a one-way hash function, where it is computationally difficult to determine the input to the hash function based on the output of the hash function. Additionally, the header 1220c of the block N+1 (block 1205c) includes a data field (previous block hash 1230c) comprising a hash representation of block N's (block 1205b) header 1220b.

The headers 1220 of the blocks 1205 may also include data fields comprising a hash representation of the block data, such as the block data hash 1270a-c. The block data hash 1270a-c may be generated, for example, by a Merkle tree and by storing the hash or by using a hash that is based on all of the block data. The headers 1220 of the blocks 1205 may comprise a respective nonce 1260a, 1260b, and 1260c. In some implementations, the value of the nonce 1260a-c is an arbitrary string that is concatenated with (or appended to) the hash of the block. The headers 1220 may comprise other data, such as a difficulty target.

The blocks 1205 may comprise a respective block data 1275a, 1275b, and 1275c (generally referred to as block data 1275). The block data 1275 may comprise a record of validated transactions that have also been integrated into the blockchain 1100 via a consensus model (described below). As discussed above, the block data 1275 may include a variety of different types of data in addition to validated transactions. Block data 1275 may include any data, such as text, audio, video, image, or file, that may be represented digitally and stored electronically.

Blockchain Transaction

In one example, a blockchain based transaction may generally involve a transfer of data or value or an interaction between entities and described in more detail below. Referring back to FIG. 10, the server 1050 may include one or more applications, for example, a transaction application configured to facilitate a blockchain transaction between entities. The entities may include users, devices, etc. The first user 1010 may request or initiate a transaction with the second user 1015 via a user application executing on the first client device 1020. The transaction may be related to a transfer of value or data from the first user 1010 to the second user 1015. The value or data may represent money, a contract, property, records, rights, status, supply, demand, alarm, trigger, or any other asset that may be represented in digital form. The transaction may represent an interaction between the first user 1010 and the second user 1015.

Figure 13:
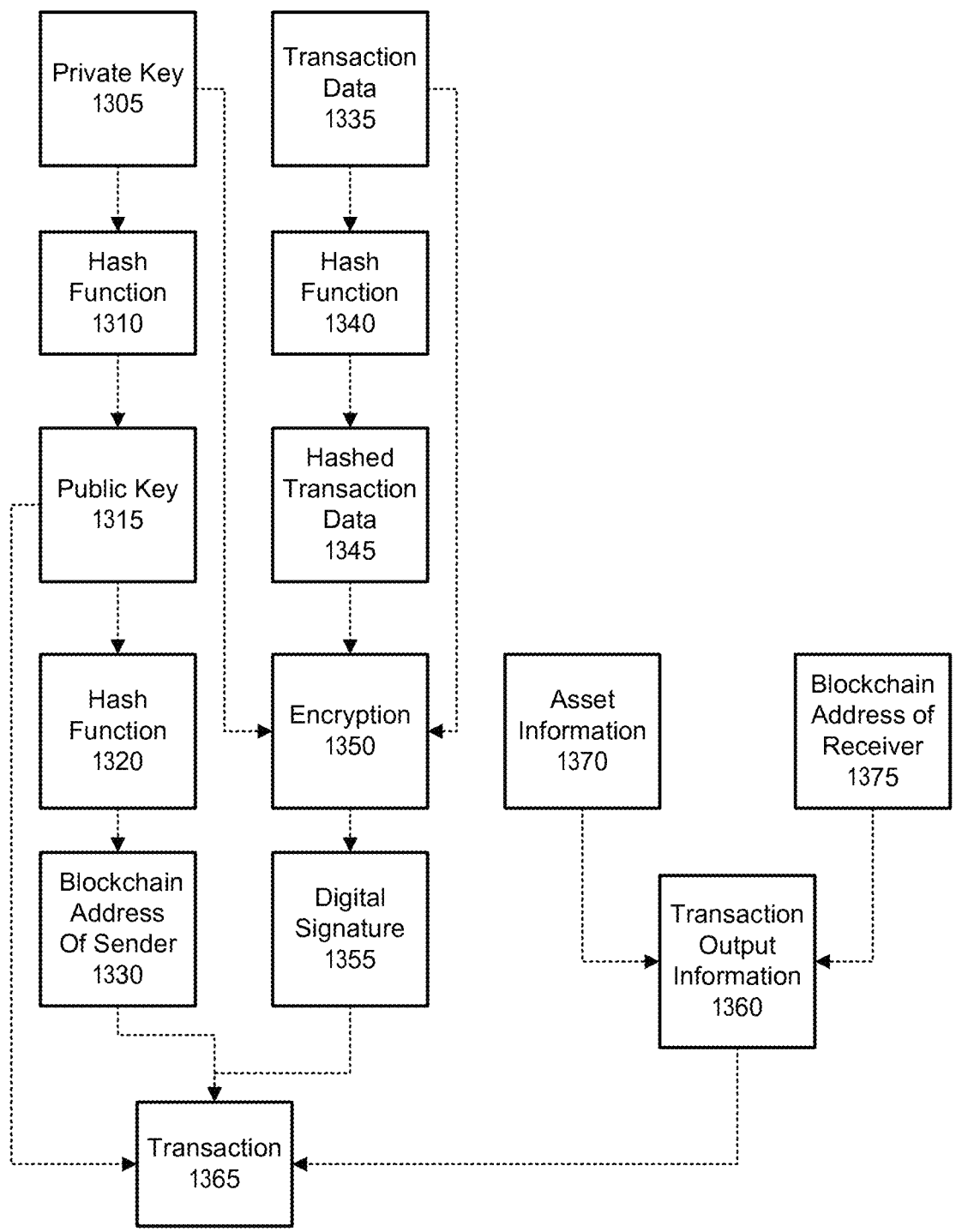
FIG. 13 is a diagram of an example transaction message.

FIG. 13 is a diagram of a transaction 1365 generated by the transaction application. The transaction 1365 may include a public key 1315, a blockchain address 1330 associated with the first user 1010, a digital signature 1355 and transaction output information 1360. The transaction application may derive a public key 1315 from a private key 1305 of the first user 1010 by applying a cryptographic hash function 1310 to the private key 1305. The cryptographic hash function 1310 may be based on AES, SHA-2, SHA-3, RSA, ECDSA, ECDH (elliptic curve cryptography), or DSA (finite field cryptography), although other cryptographic models may be utilized. More information about cryptographic algorithms may be found in Federal Information Processing Standards Publication (FIPS PUB 180-3), Secure Hash Standard. The transaction application may derive an address or identifier for the first user 1010, such as the blockchain address 1330, by applying a hash function 1320 to the public key 1315. Briefly, a hash function is a function that may be used for mapping arbitrary size data to fixed size data. The value may also be referred to as a digest, a hash value, a hash code, or a hash. In order to indicate that the first user 1010 is the originator of the transaction 1365, the transaction application may generate the digital signature 1355 for the transaction data 1335 using the private key 1305 of the first user 1010. The transaction data 1335 may include information about the assets to be transferred and a reference to the sources of the assets, such as previous transactions in which the assets were transferred to the first user 1310 or an identification of events that originated the assets. Generating the digital signature 1355 may include applying a hash function 1340 to the transaction data 1335 resulting in hashed transaction data 1345. The hashed transaction data 1345 and the transaction data 1335 may be encrypted (via an encryption function 1350) using the private key 1305 of the first user 1010 resulting in the digital signature 1355. The transaction output information 1360 may include asset information 1370 and an address or identifier for the second user 1015, such as the blockchain address 1375. The transaction 1365 may be sent from the first client device 1025 to the server 1050.

The specific type of cryptographic algorithm being utilized may vary dynamically based on various factors, such as a length of time, privacy concerns, etc. For example, the type of cryptographic algorithm being utilized may be changed yearly, weekly, daily, etc. The type of algorithms may also change based on varying levels of privacy. For example, an owner of content may implement a higher level of protection or privacy by utilizing a stronger algorithm.

Blockchain Addresses

A blockchain network may utilize blockchain addresses to indicate an entity using the blockchain or start and end points in the transaction. For example, a blockchain address for the first user 1010, shown in FIG. 13 as the blockchain address of sender 1330, may include an alphanumeric string of characters derived from the public key 1315 of the first user 1010 based on applying a cryptographic hash function 1320 to the public key 1315. The methods used for deriving the addresses may vary and may be specific to the implementation of the blockchain network. In some examples, a blockchain address may be converted into a QR code representation, barcode, token, or other visual representations or graphical depictions to enable the address to be optically scanned by a mobile device, wearables, sensors, cameras, etc. In addition to an address or QR code, there are many ways of identifying individuals, objects, etc. represented in a blockchain. For example, an individual may be identified through biometric information such as a fingerprint, retinal scan, voice, facial id, temperature, heart rate, gestures/movements unique to a person etc., and through other types of identification information such as account numbers, home address, social security number, formal name, etc.

Broadcasting Transaction

Figure 14:
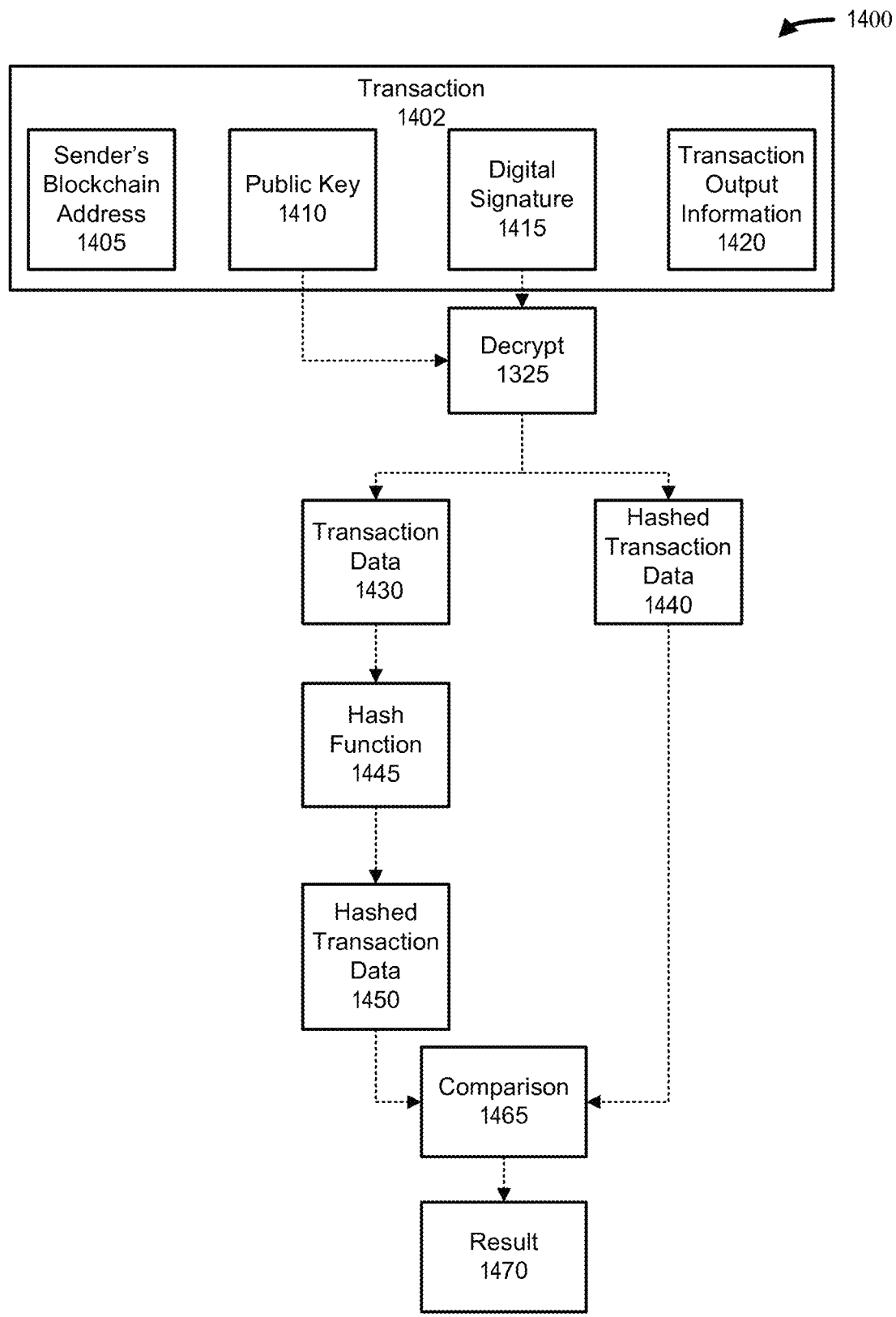
FIG. 14 shows an example transaction broadcast the blockchain network.

The server 1050 may receive transactions from users of the blockchain network 1030. The transactions may be submitted to the server 1050 via desktop applications, smartphone applications, digital wallet applications, web services, or other software applications. The server 1050 may send or broadcast the transactions to the blockchain network 1330. FIG. 14 shows an example transaction 1402 broadcast by the server 1050 to the blockchain network 1030. The transaction 1402 may be broadcast to multiple nodes 1005 of the blockchain network 1030. Typically, once the transaction 1402 is broadcast or submitted to the blockchain network 1030, it may be received by one or more of the nodes 1005. Once the transaction 1402 is received by the one or more nodes 1005 of the blockchain network 1230, it may be propagated by the receiving nodes 1005 to other nodes 1005 of the blockchain network 1230.

A blockchain network may operate according to a set of rules. The rules may specify conditions under which a node may accept a transaction, a type of transaction that a node may accept, a type of compensation that a node receives for accepting and processing a transaction, etc. For example, a node may accept a transaction based on a transaction history, reputation, computational resources, relationships with service providers, etc. The rules may specify conditions for broadcasting a transaction to a node. For example, a transaction may be broadcast to one or more specific nodes based on criteria related to the node's geography, history, reputation, market conditions, docket/delay, technology platform. The rules may be dynamically modified or updated (e.g., turned on or off) to address issues such as latency, scalability and security conditions. A transaction may be broadcast to a subset of nodes as a form of compensation to entities associated with those nodes (e.g., through receipt of compensation for adding a block of one or more transactions to a blockchain).

Transaction Validation—User Authentication and Transaction Data Integrity

Not all the full nodes 1005 may receive the broadcasted transaction 1402 at the same time, due to issues such as latency. Additionally, not all of the full nodes 1005 that receive the broadcasted transaction 1402 may choose to validate the transaction 1402. A node 1005 may choose to validate specific transactions, for example, based on transaction fees associated with the transaction 1402. The transaction 1402 may include a blockchain address 1405 for the sender, a public key 1410, a digital signature 1415, and transaction output information 1420. The node 1005 may verify whether the transaction 1402 is legal or conforms to a pre-defined set of rules. The node 1005 may also validate the transaction 1402 based on establishing user authenticity and transaction data integrity. User authenticity may be established by determining whether the sender indicated by the transaction 1402 is in fact the actual originator of the transaction 1402. User authenticity may be proven via cryptography, for example, asymmetric-key cryptography using a pair of keys, such as a public key and a private key. Additional factors may be considered when establishing user authenticity, such as user reputation, market conditions, history, transaction speed, etc. Data integrity of the transaction 1402 may be established by determining whether the data associated with the transaction 1402 was modified in any way. Referring back to FIG. 12, when the transaction application creates the transaction 1265, it may indicate that the first user 1010 is the originator of the transaction 1265 by including the digital signature 1255.

The node 1005 may decrypt the digital signature 1415 using the public key 1410. A result of the decryption may include hashed transaction data 1440 and transaction data 1430. The node 1005 may generate hashed transaction data 1450 based on applying a hash function 1445 to the transaction data 1430. The node 1005 may perform a comparison 1465 between the first hashed transaction data 1440 and the second hashed transaction data 1450. If the result 1470 of the comparison 1465 indicates a match, then the data integrity of the transaction 1402 may be established and node 1005 may indicate that the transaction 1402 has been successfully validated. Otherwise, the data of the transaction 1402 may have been modified in some manner and the node 1005 may indicate that the transaction 1402 has not been successfully validated.

Each full node 1005 may build its own block and add validated transactions to that block. Thus, the blocks of different full nodes 1005 may comprise different validated transactions. As an example, a full node 1005*a* may create a first block comprising transactions "A," "B," and "C." Another full node 1005*b* may create a second block comprising transactions "C," "D," and "E." Both blocks may include valid transactions. However, only one block may get added to the blockchain, otherwise the transactions that the blocks may have in common, such as transaction "C" may be recorded twice leading to issues such as double-spending when a transaction is executed twice. One problem that may be seen with the above example is that transactions "C," "D," and "E" may be overly delayed in being added to the blockchain. This may be addressed a number of different ways as discussed below.

Securing Keys

Private keys, public keys, and addresses may be managed and secured using software, such as a digital wallet. Private keys may also be stored and secured using hardware. The digital wallet may also enable the user to conduct transactions and manage the balance. The digital wallet may be stored or maintained online or offline, and in software or hardware or both hardware and software. Without the public/private keys, a user has no way to prove ownership of assets. Additionally, anyone with access a user's public/private keys may access the user's assets. While the assets may be recorded on the blockchain, the user may not be able to access them without the private key.

Tokens

A token may refer to an entry in the blockchain that belongs to a blockchain address. The entry may comprise information indicating ownership of an asset. The token may represent money, a contract, property, records, access rights, status, supply, demand, alarm, trigger, reputation, ticket, or any other asset that may be represented in digital form. For example, a token may refer to an entry related to cryptocurrency that is used for a specific purpose or may represent ownership of a real-world asset, such as Fiat currency or real-estate. Token contracts refer to cryptographic tokens that represent a set of rules that are encoded in a smart contract. The person that owns the private key corresponding to the blockchain address may access the tokens at the address. Thus, the blockchain address may represent an identity of the person that owns the tokens. Only the owner of the blockchain address may send the token to another person. The tokens may be accessible to the owner via the owner's wallet. The owner of a token may send or transfer the token to a user via a blockchain transaction. For example, the owner may sign the transaction corresponding to the transfer of the token with the private key. When the token is received by the user, the token may be recorded in the blockchain at the blockchain address of the user.

Establishing User Identity

While a digital signature may provide a link between a transaction and an owner of assets being transferred, it may not provide a link to the real identity of the owner. In some cases, the real identity of the owner of the public key corresponding to the digital signature may need to be established. The real identity of an owner of a public key may be verified, for example, based on biometric data, passwords, personal information, etc. Biometric data may comprise any physically identifying information such as fingerprints, face and eye images, voice sample, DNA, human movement, gestures, gait, expressions, heart rate characteristics, temperature, etc.

Publishing and Validating a Block

As discussed above, full nodes 1005 may each build their own blocks that include different transactions. A node may build a block by adding validated transactions to the block until the block reaches a certain size that may be specified by the blockchain rules. However, only one of the blocks may be added to the blockchain. The block to be added to the blockchain and the ordering of the blocks may be determined based on a consensus model. In a proof of work model, both nodes may compete to add their respective block to the blockchain by solving a complex mathematical puzzle. For example, such a puzzle may include determining a nonce, as discussed above, such that a hash (using a predetermined hashing algorithm) of the block to be added to the blockchain (including the nonce) has a value that meets a range limitation. If both nodes solve the puzzle at the same time, then a "fork" may be created. When a full node 1005 solves the puzzle, it may publish its block to be validated by the validation nodes 1005 of the blockchain network 1030.

In a proof of work consensus model, a node validates a transaction, for example, by running a check or search through the current ledger stored in the blockchain. The node will create a new block for the blockchain that will include the data for one or more validated transactions (see, e.g., block 1275 of FIG. 12). In a blockchain implementation such as Bitcoin, the size of a block is constrained. Referring back to FIG. 12, in this example, the block will include a Previous Block Hash 1230 representing a hash of what is currently the last block in the blockchain. The block may also include a hash 1270 of its own transaction data (e.g., a so-called Merkle hash). According to a particular algorithm, all or selected data from the block may be hashed to create a final hash value. According to an embodiment of the proof of work model, the node will seek to modify the data of the block so that the final hash value is less than a preset value. This is achieved through addition of a data value referred to as a nonce 1260. Because final hash values cannot be predicted based on its input, it is not possible to estimate an appropriate value for the nonce 1260 that will result in a final hash value that is less than the preset value. Accordingly, in this embodiment, a computationally-intensive operation is needed at the node to determine an appropriate nonce value through a "brute force" trial-and-error method. Once a successful nonce value is determined, the completed block is published to the blockchain network for validation. If validated by a majority of the nodes in the block chain network, the completed block is added to the blockchain at each participating node. When a node's block is not added to the blockchain, the block is discarded and the node proceeds to build a new block. The transactions that were in the discarded block may be returned to a queue and wait to be added to a next block. When a transaction is discarded or returned to the queue, the assets associated with the discarded transaction are not lost, since a record of the assets will exist in the blockchain. However, when a transaction is returned to the queue it causes a delay in completing the transaction. Reducing the time to complete a transaction may be important. A set of blockchain rules, or renumeration/compensation for a node to process the returned transaction may determine how a returned transaction is to be treated going forward. When a transaction is put into a pool then it can have a priority level but then a rule may indicate that the transaction priority level must exceed a threshold level. The priority level of a returned or discarded transaction may be increased. Another way to reduce the time to complete a transaction is to have the system, service provider, participant in the transaction, or merchant pay additional incentive for nodes to process a returned transaction. As an example, a service provider may identify a network of preferred miners based on geography or based on a volume discount perspective. The time to complete a transaction may be optimized by routing a returned transaction to specific preferred nodes. A transaction may be associated with an address that limits which of the preferred nodes will get to process the transaction if it is returned due to its inclusion in a discarded block. A value may be associated with the transaction so that it goes to preferred miners in a specific geographic location. Additionally, returned transactions may be processed based on pre-set rules. For example, a rule may indicate a commitment to process a specific number of returned transactions to receive additional incentive or compensation.

Blockchain Confirmations

After a block comprising a transaction is added to a blockchain, a blockchain confirmation may be generated for the transaction. The blockchain confirmation may be a number of blocks added to the blockchain after the block that includes the transaction. For example, when a transaction is broadcast to the blockchain, there will be no blockchain confirmations associated with the transaction. If the transaction is not validated, then the block comprising the transaction will not be added to the blockchain and the transaction will continue to have no blockchain confirmations associated with it. However, if a block comprising the transaction is validated, then each of the transactions in the block will have a blockchain confirmation associated with the transaction. Thus, a transaction in a block will have one blockchain confirmation associated with it when the block is validated. When the block is added to the blockchain, each of the transactions in the block will have two blockchain confirmations associated with it. As additional validated blocks are added to the blockchain, the number of blockchain confirmations associated with the block will increase. Thus, the number of blockchain confirmations associated with a transaction may indicate a difficulty of overwriting or reversing the transaction. A higher valued transaction may require a larger number of blockchain confirmations before the transaction is executed.

Consensus Models

As discussed above, a blockchain network may determine which of the full nodes 1005 publishes a next block to the blockchain. In a permissionless blockchain network, the nodes 1005 may compete to determine which one publishes the next block. A node 1005 may be selected to publish its block as the next block in the blockchain based on consensus model. For example, the selected or winning node 1005 may receive a reward, such as a transaction fee, for publishing its block, for example. Various consensus models may be used, for example, a proof of work model, a proof of stake model, a delegated proof of stake model, a round robin model, proof of authority or proof of identity model, and proof of elapsed time model.

In a proof of work model, a node may publish the next block by being the first to solve a computationally intensive mathematical problem (e.g., the mathematical puzzle described above). The solution serves as "proof" that the node expended an appropriate amount of effort in order to publish the block. The solution may be validated by the full nodes before the block is accepted. The proof of work model, however, may be vulnerable to a 51% attack described below. The proof of stake model is generally less computationally intensive that the proof of work model. Unlike the proof of work model which is open to any node having the computational resources for solving the mathematical problem, the proof of stake model is open to any node that has a stake in the system. The stake may be an amount of cryptocurrency that the blockchain network node (user) may have invested into the system. The likelihood of a node publishing the next block may be proportional to its stake. Since this model utilizes fewer resources, the blockchain may forego a reward as incentive for publishing the next block. The round robin model is generally used by permissioned blockchain networks. Using this model, nodes may take turns to publish new blocks. In the proof of elapsed time model, each publishing node requests a wait time from a secure hardware within their computer system. The publishing node may become idle for the duration of the wait time and then creates and publishes a block to the blockchain network. As an example, in cases where there is a need for speed and/or scalability (e.g., in the context of a corporate environment), a hybrid blockchain network may switch to be between completely or partially permissioned and permissionless. The network may switch based on various factors, such as latency, security, market conditions, etc.

Forks

As discussed above, consensus models may be utilized for determining an order of events on a blockchain, such as which node gets to add the next block and which node's transaction gets verified first. When there is a conflict related to the ordering of events, the result may be a fork in the blockchain. A fork may cause two versions of the blockchain to exist simultaneously. Consensus methods generally resolve conflicts related to the ordering of events and thus, prevent forks from occurring. In some cases, a fork may be unavoidable. For example, with a proof of work consensus model, only one of the nodes competing to solve a puzzle may win by solving its puzzle first. The winning node's block is then validated by the network. If the winning node's block is successfully validated by the network, then it will be the next block added to the blockchain. However, it may be the case that two nodes may end up solving their respective puzzles at the same time. In such a scenario, the blocks of both winning nodes may be broadcast to the network. Since different nodes may receive notifications of a different winning node, the nodes that receive notification of the first node as the winning node may add the first node's block to their copy of the blockchain. Nodes that receive notification of the second node as the winning node may add the second node's block to their copy of the blockchain. This results in two versions of the blockchain or a fork. This type of fork may be resolved by the longest chain rule of the proof of work consensus model. According to the longest chain rule, if two versions of the blockchain exist, then the network the chain with a larger number of blocks may be considered to be the valid blockchain. The other version of the blockchain may be considered as invalid and discarded or orphaned. Since the blocks created by different nodes may include different transactions, a fork may result in a transaction being included in one version of the blockchain and not the other. The transactions that are in a block of a discarded blockchain may be returned to a queue and wait to be added to a next block.

In some cases, forks may result from changes related to the blockchain implementation, for example, changes to the blockchain protocols and/or software. Forks may be more disruptive for permissionless and globally distributed blockchain networks than for private blockchain networks due to their impact on a larger number of users. A change or update to the blockchain implementation that is backwards compatible may result in a soft fork. When there is a soft fork, some nodes may execute the update blockchain implementation while other nodes may not. However, nodes that do not update to the new blockchain implementation may continue to transact with updated nodes.

A change to the blockchain implementation that is not backwards compatible may result in a hard fork. While hard forks are generally intentional, they may also be caused by unintentional software bugs/errors. In such a case, all publishing nodes in the network may need to update to the new blockchain implementation. While publishing nodes that do not update to the new blockchain implementation may continue to publish blocks according to the previous blockchain implementation, these publishing nodes may reject blocks created based on the new blockchain implementation and continue to accept blocks created based on the previous blockchain implementation. Therefore, nodes on different hard fork versions of the blockchain may not be able to interact with one another. If all nodes move to the new blockchain implementation, then the previous version may be discarded or abandoned. However, it may not be practical or feasible to update all nodes in the network to a new blockchain implementation, for example, if the update invalidates specialized hardware utilized by some nodes.

Blockchain Based Application: Cryptocurrency

Cryptocurrency is a medium of exchange that may be created and stored electronically in a blockchain, such as the blockchain 1030a in FIG. 10. Bitcoin is one example of cryptocurrency, however there are several other cryptocurrencies. Various encryption techniques may be used for creating the units of cryptocurrency and verifying transactions. As an example, the first user 1010 may own 10 units of a cryptocurrency. The blockchain 1030a may include a record indicating that the first user 1010 owns the 10 units of cryptocurrency. The first user 1010 may initiate a transfer of the 10 units of cryptocurrency to the second user 1015 via a wallet application executing on the first client device 1020. The wallet application may store and manage a private key of the first user 1010. Examples of the wallet device include a personal computer, a laptop computer, a smartphone, a personal data assistant (PDA), etc.

Figure 15:
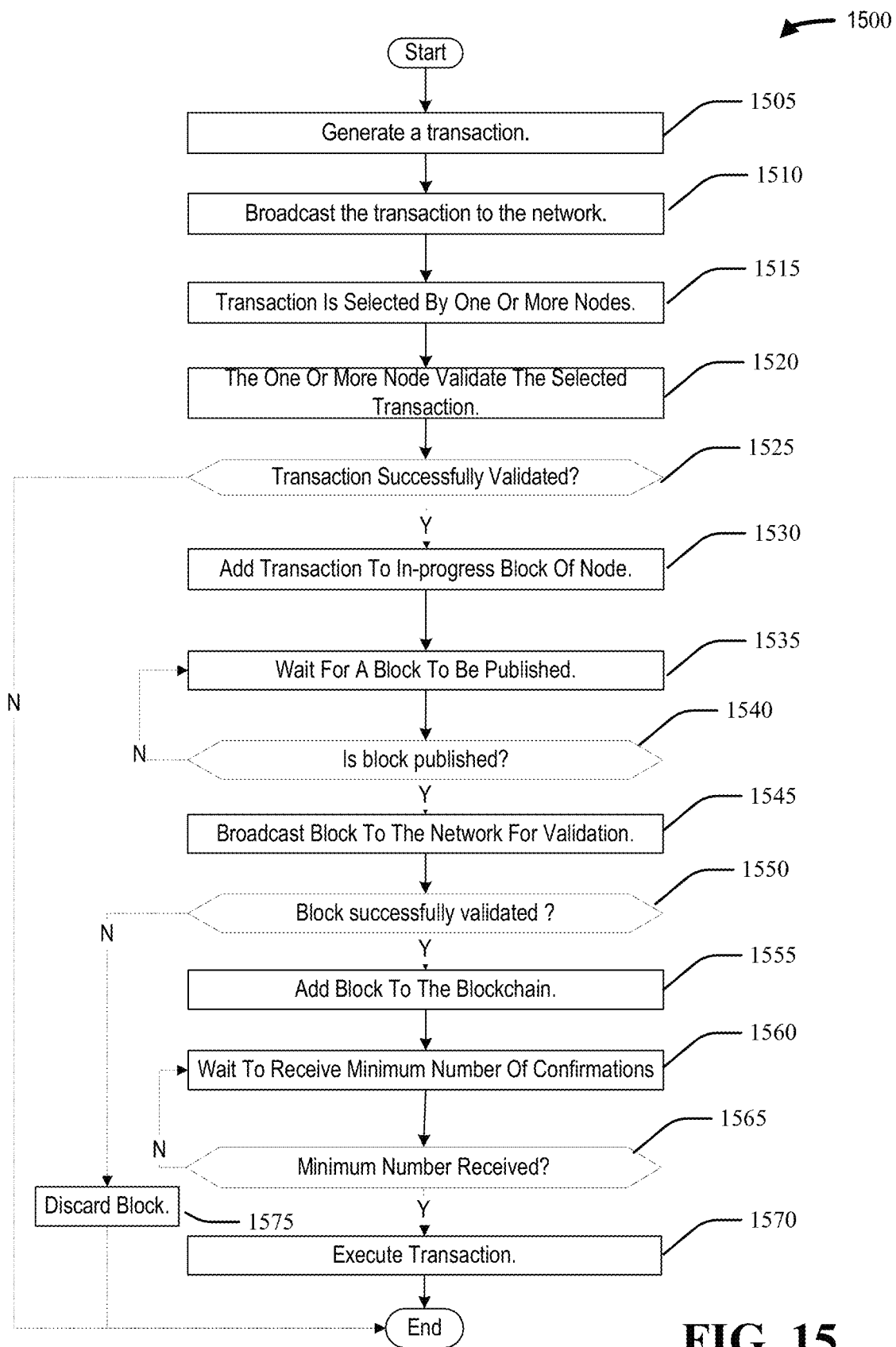
FIG. 15 is a flow diagram showing steps of an example computer-implemented method for performing a blockchain based transaction.

FIG. 15 is a flow diagram showing steps of an example method 1500 for performing a blockchain transaction between entities, such as the first user 1010 of the first client device 1020 and the second user 1015 of the second client device 1025 in FIG. 10. The steps of the method 1500 may be performed by any of the computing devices shown in FIG. 10. Alternatively or additionally, some or all of the steps of the method 1500 may be performed by one or more other computing devices. Steps of the method 1500 may be modified, omitted, and/or performed in other orders, and/or other steps added.

At step 1505, the wallet application may generate transaction data for transferring the 10 units of cryptocurrency from the first user 1010 to the second user 1015. The wallet application may generate a public key for the transaction using the private key of the first user 1010. In order to indicate that the first user 1010 is the originator of the transaction, a digital signature may also be generated for the transaction using the private key of the first user 1010. As discussed with reference to FIG. 12, the transaction data may include information, such as a blockchain address of the sender 1230, the digital signature 1255, transaction output information 1260, and the public key of the sender 1215. The transaction data may be sent to the server 1050 from the first client device 1025.

The server 1050 may receive the transaction data from the first client device 1025. At step 1510, the server 1050 may broadcast the transaction to the blockchain network 1030*a*. The transaction may be received by one or more nodes 1105 of the blockchain network 1030*a*. At step 1515, upon receiving the transaction, a node 1105 may choose to validate the transaction, for example, based on transaction fees associated with the transaction. If the transaction is not selected for validation by any of the nodes 1105, then the transaction may be placed in a queue and wait to be selected by a node 1105.

At step 1520, each of the nodes 1105 that selected the transaction may validate the transaction. Validating the transaction may include determining whether the transaction is legal or conforms to a pre-defined set of rules for that transaction, establishing user authenticity, and establishing transaction data integrity. At step 1525, if the transaction is successfully validated by a node 1105, the validated transaction is added to a block being constructed by that node 1105. As discussed above, since different nodes 1105 may choose to validate different transactions, different nodes 1105 may build or assemble a block comprising different validated transactions. Thus, the transaction associated with the first user 1010 transferring 10 units of cryptocurrency to the second user 1015 may be included in some blocks and not others.

At step 1535, the blockchain network 1030*a* may wait for a block to be published. Validated transactions may be added to the block being assembled by a node 1105 until it reaches a minimum size specified by the blockchain. If the blockchain network 1030*a* utilizes a proof of work consensus model, then the nodes 1105 may compete for the right to add their respective blocks to the blockchain by solving a complex mathematical puzzle. The node 1105 that solves its puzzle first wins the right to publish its block. As compensation, the winning node may be awarded a transaction fee associated with the transaction (e.g., from the wallet of the first user 1010). Alternatively, or in addition, the winning node may be awarded compensation as an amount of cryptocurrency added to an account associated with the winning node from the blockchain network (e.g., "new" units of cryptocurrency entering circulation). This latter method of compensation and releasing new units of cryptocurrency into circulation is sometimes referred to as "mining." At step 1540, if a block has not been published, then the process 1500 returns to step 1535 and waits for a block to be published. However, at step 1540, if a block has been published, then the process 1500 proceeds to step 1545.

At step 1545, the published block is broadcast to the blockchain network 1030*a* for validation. At step 1550, if the block is validated by a majority of the nodes 1105, then at step 1555, the validated block is added to the blockchain 1120. However, at step 1550, if the block is not validated by a majority of the nodes 1105, then the process 1500 proceeds to step 1575. At step 1575, the block is discarded and the transactions in the discarded block are returned back to the queue. The transactions in the queue may be selected by one or more nodes 1105 for the next block. The node 1105 that built the discarded block may build a new next block.

At step 1560, if the transaction was added to the blockchain 1120, the server 1050 may wait to receive a minimum number of blockchain confirmations for the transaction. At step 1565, if the minimum number of confirmations for the transaction have not been received, then the process may return to step 1560. However, if at step 1565, the minimum number of confirmations have been received, then the process proceeds to step 1570. At step 1570, the transaction may be executed and assets from the first user 1010 may be transferred to the second user 1015. For example, the 10 units of cryptocurrency owned by the first user 1010 may be transferred from a financial account of the first user 1010 to a financial account of the second user 1015 after the transaction receives at least three confirmations.

Smart Contracts

A smart contract is an agreement that is stored in a blockchain and automatically executed when the agreement's predetermined terms and conditions are met. The terms and conditions of the agreement may be visible to other users of the blockchain. When the predefined rules are satisfied, then the relevant code is automatically executed. The agreement may be written as a script using a programming language such as Java, C++, JavaScript, VBScript, PHP, Perl, Python, Ruby, ASP, Tcl, etc. The script may be uploaded to the blockchain as a transaction on the blockchain.

As an example, the first user 1010 (also referred to as tenant 1010) may rent an apartment from the second user 1015 (also referred to as landlord 1015). A smart contract may be utilized between the tenant 1010 and the landlord 1015 for payment of the rent. The smart contract may indicate that the tenant 1010 agrees to pay next month's rent of $1000 by the 28th of the current month. The agreement may also indicate that if the tenant 1010 pays the rent, then the landlord 1015 provides the tenant 1010 with an electronic receipt and a digital entry key to the apartment. The agreement may also indicate that if the tenant 1010 pays the rent by the 28th of the current month, then on the last day of the current month, both the entry key and the rent are released respectively to the tenant 1010 and the landlord 1015.

Figure 16:
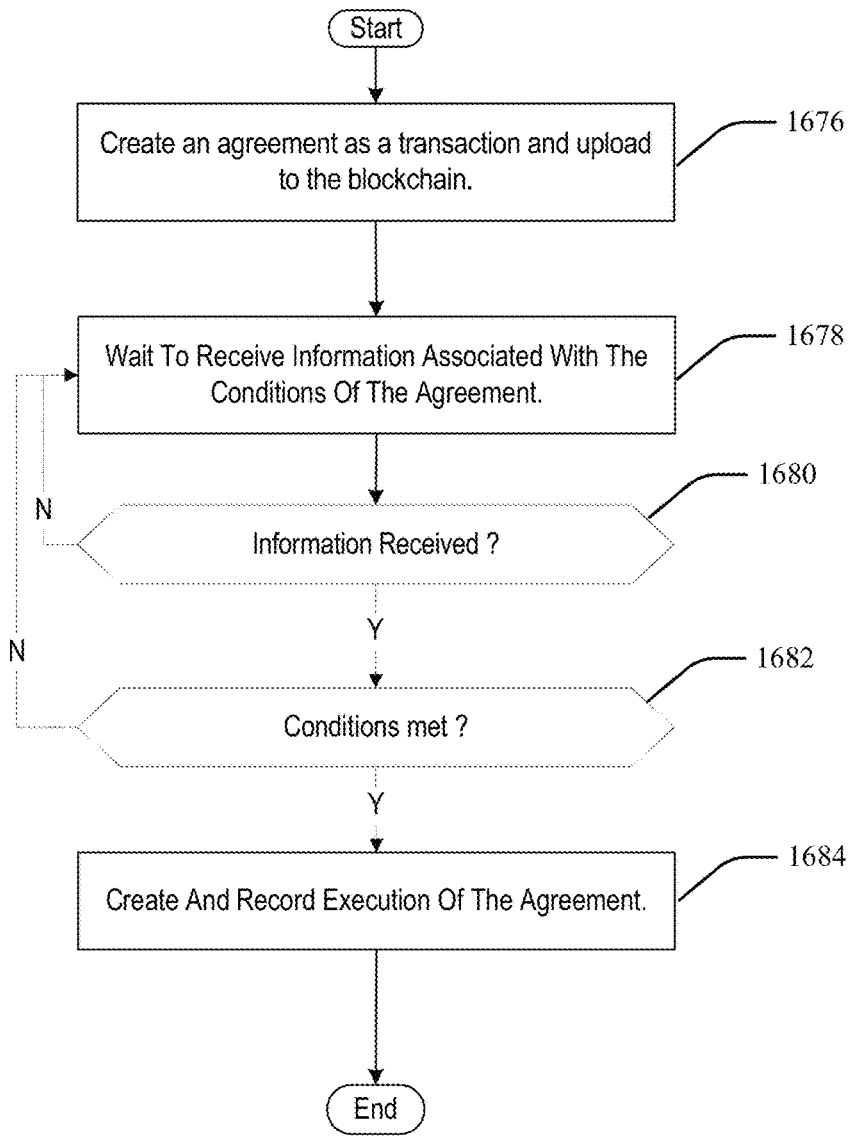
FIG. 16 is a flow diagram showing steps of an example computer-implemented method for performing a blockchain based transaction.

FIG. 16 is a flow diagram showing steps of an example method 1601 for performing a smart contract transaction between entities, such as the tenant 1010 and the landlord 1015. The steps of the method 1601 may be performed by any of the computing devices shown in FIG. 10. Alternatively or additionally, some or all of the steps of the method 1601 may be performed by one or more other computing devices. Steps of the method 1601 may be modified, omitted, and/or performed in other orders, and/or other steps added.

At step 1676, the agreement or smart contract between the tenant 1010 and the landlord 1015 may be created and then submitted to the blockchain network 1030*a* as a transaction. The transaction may be added to a block that is mined by the nodes 1105 of the blockchain network 1030*a*, the block comprising the transaction may be validated by the blockchain network 1030*a* and then recorded in the blockchain 1120 (as shown in steps 1510-1555 in FIG. 15). The agreement associated with the transaction may be given a unique address for identification.

At step 1678, the process 1601 waits to receive information regarding the conditions relevant for the agreement. For example, the process 1601 may wait to receive notification that $1000 was sent from a blockchain address associated with the tenant 1010 and was received at a blockchain address associated with the landlord 1015 by the 28th of the current month. At step 1680, if such a notification is not received, then the process 1601 returns to step 1678. However, if at step 1680, a notification is received, then the process 1601 proceeds to step 1682.

At step 1682, based on determining that the received notification satisfies the conditions needed to trigger execution of the various terms of the smart contract, the process 1601 proceeds to step 1684. However, at step 1682, if it is determined that the received notification does not satisfy the conditions needed to trigger execution of the smart contract, then the process 1601 returns to step 1678. At step 1684, the process 1601 creates a transaction associated with execution of the smart contract. For example, the transaction may include information of the payment received, the date the payment was received, an identification of the tenant 1010 and an identification of the landlord 1015. The transaction may be broadcast to the blockchain network 1030*a* and recorded in the blockchain 1120 (as shown in steps 1510-1555 of the process 1500 of FIG. 15). If the transaction is successfully recorded in the blockchain 1120, the transaction may be executed. For example, if the payment was received on the 28th, then an electronic receipt may be generated and sent to the tenant 1010. However, on the last day of the current month, both the digital entry key and the rent are released respectively to the tenant 1010 and the landlord 1015.

Smart contracts may execute based on data received from entities that are not on the blockchain or off-chain resources. For example, a smart contract may be programmed to execute if a temperature reading from a smart sensor or IoT sensor falls below 10 degrees. Smart contracts are unable to pull data from off-chain resources. Instead, such data needs to be pushed to the smart contract. Additionally, even slight variations in data may be problematic since the smart contract is replicated across multiple nodes of the network. For example, a first node may receive a temperature reading of 9.8 degrees and a second node may receive a temperature reading of 10 degrees. Since validation of a transaction is based on consensus across nodes, even small variations in the received data may result in a condition of the smart contract to be evaluated as being not satisfied. Third party services may be utilized to retrieve off-chain resource information and push this to the blockchain. These third party services may be referred to as oracles. Oracles may be software applications, such as a big data application, or hardware, such as an IoT or smart device. For example, an oracle service may evaluate received temperature readings beforehand to determine if the readings are below 10 degrees and then push this information to the smart contract. However, utilizing oracles may introduce another possible point of failure into the overall process. Oracles may experience errors, push incorrect information or may even go out of business.

Since blockchains are immutable, amending or updating a smart contract that resides in a blockchain may be challenging and thus, more expensive and/or more restrictive than with text-based contracts.

Internet of Things (IOT)

An IoT network may include devices and sensors that collect data and relay the data to each other via a gateway. The gateway may translate between the different protocols of the devices and sensors as well as manage and process the data. IoT devices may, for example, collect information from their environments such as motions, gestures, sounds, voices, biometric data, temperature, air quality, moisture, and light. The collected information sent over the Internet for further processing. Typically, IoT devices use a low power network, Bluetooth, Wi-Fi, or satellite to connect to the Internet or "the cloud". Some IoT related issues that blockchain may be able to detect include a lack of compliance in the manufacturing stage of an IoT device. For example, a blockchain may track whether an IoT device was adequately tested.

As discussed above, information from off-chain resources, including IoT devices, may be pushed to smart contracts via third party entities known as oracles. As an example, a smart refrigerator may monitor the use of an item stored in the refrigerator, such as milk. Various sensors within the refrigerator may be utilized for periodically determining an amount of milk stored in the refrigerator. A smart contract stored in a blockchain may indicate that if the weight of the stored milk falls below 10 ounces, then a new carton of milk is automatically purchased and delivered. The refrigerator sensors may periodically send their readings to a third party service or oracle. The oracle may evaluate the sensor readings to determine whether the conditions for purchasing a new carton of milk have been met. Upon determining that the weight of the stored milk is below 10 ounces, the oracle may push information to the smart contract indicating that the condition for executing the smart contract has been met. The smart contract may execute, and a new carton of milk may be automatically purchased. Both the execution of the smart contract and the purchase of the new carton may be recorded in the blockchain. In some cases, the condition may be an occurrence of an event, such as a need or anticipated need, or convenience factors, such as a delivery day, cost, promotions, or incentives.

Some issues related to the integration of blockchain into IoT include speed of transactions and computational complexity. The speed at which transactions are executed on the blockchain may be important when IoT networks with hundreds or thousands of connected devices are all functioning and transacting simultaneously. IoT devices are generally designed for connectivity rather than computation and therefore, may not have the processing power to support a blockchain consensus algorithm, such as proof of work. IoT devices also tend to be vulnerable to hacking via the Internet and/or physical tampering. For example, IoT devices may be more vulnerable to DDoS and malware attacks. Hackers may target a specific network and begin spamming the network with traffic within a short amount of time. Because of the increased surge in traffic, the bandwidth may be quickly overloaded, and the entire system may crash.

Supply Chain Monitoring and Logistics

A supply chain for a product may include a network of entities and activities that are involved in the creation of the product and its eventual sale to a customer. A blockchain based record of the supply chain for a product may be utilized, for example, to trace the provenance of parts and materials and to prevent counterfeit parts from entering the supply chain. Blockchain integration into the supply chain for a product may utilize IoT devices and data, oracles, and smart contracts. For example, an RFID tag may be attached to a product in order to physically track the product and record its location within the supply chain. Additionally, smart contracts may be utilized to record the various activities and interactions between entities that are involved in the product's supply chain. As discussed above, any data or information that may be digitally represented and electronically stored may be recorded in a blockchain by submitting the data as part of a blockchain transaction. When the transaction is included in a validated block that is added to the blockchain, the transaction and its associated data is recorded in the blockchain.

As an example, a permissioned blockchain may be utilized for recording and monitoring the entities and activities involved in food distribution, such as fruit or vegetables. The blockchain may be accessible to entities, such as the suppliers of seed and pesticides, farmers, distributors, grocery stores, customers, and regulators. The blockchain may record activities such as the sale of a pesticide and/or seed to the farmer, the harvesting and packaging of the fruit, its shipment to distributors' warehouses, its arrival at various stores, and eventual purchase by a consumer. Sensors and RFID devices may be utilized for tracking the fruit through the supply chain. For example, the fruit may be packaged in crates tagged with a unique RFID device. When the tagged crate is loaded onto a truck for shipment from the farm to a distributor, the crate may be scanned, and a record of its shipment may be uploaded to the blockchain. When the crate arrives at a warehouse, it may be scanned again and a record of its arrival at the warehouse may be uploaded to the blockchain. Additionally, smart contracts may be executed throughout the supply chain. For example, when the crate is scanned at the warehouse, a smart contract between the farmer and the warehouse may be executed indicating that the crate was successfully shipped from the farmer to the warehouse and received by the warehouse.

As another example, a permissioned blockchain for an automobile may store a record of entities and activities related to a component that is utilized in the manufacturing of the automobile. The blockchain may be accessible to various entities, such as automobile OEMs, distributors and suppliers of materials and components, dealerships, mechanics, insurance providers, and others. While evaluating an accident involving a policy holder's automobile, an insurance provider 1010 may determine that the accident may have been caused by a defective component used in a wheel of the automobile. The insurance provider 1010 may wish to trace a provenance of the component based on information recorded in the permissioned blockchain. The insurance provider 1010 may query the blockchain data for information related to the component via, for example, a blockchain querying application executing on the first client device 1020. The query may include identifying information associated with the component. For example, the component may be marked with an identification that is unique to the component or a group of components. The results of the query may include records in the blockchain of the entities and activities that were involved in the creation of the component and its eventual sale to the automobile manufacturer.

Blockchain Enabled In-Store Purchasing

Figure 18:
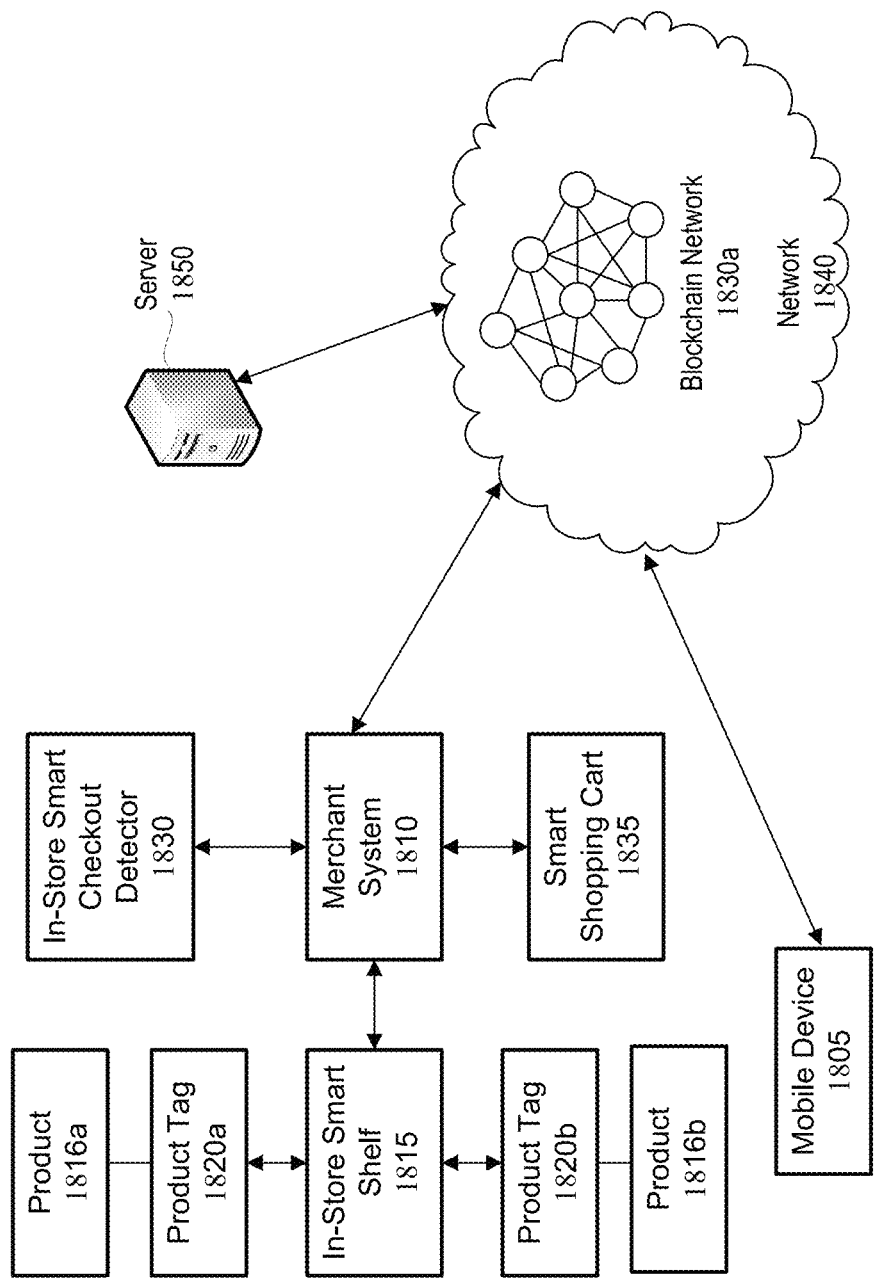
FIG. 18 illustrates an example of a blockchain enabled in-store purchase system.

An example of blockchain enabled in-store purchasing is described with reference to the system 1800 shown in FIG. 18 and the process 1500 shown in FIG. 15. FIG. 18 illustrates an example of a blockchain enabled in-store purchase system 1800. The system 1800 includes a mobile device 1805, a merchant system 1810, and a server 1850 connected via a network 1840. The merchant system 1810 may be connected via a local wireless network to various IoT devices within a store, for example, an in-store smart shelf 1815, and an in-store smart checkout detector 1830.

The store may include one or more smart shelves, such as the in-store smart shelf 1815. The smart shelf 1815 may include an RFID tag, an RFID reader, and an antenna. One or more products may be stored on the in-store smart shelf 1815. Each product may include an RFID tag, such as a first product tag 1820*a* attached to a first product 1816*a* and a second product tag 1820*b* attached to a second product 1816*b*. The in-store smart shelf 1815 may, based on reading the product tags 1820*a* and 1820*b*, send information about the products 1816*a* and 1816*b* throughout the day to the merchant system 1810. The merchant system 1810 may in turn update an inventory of products currently within the store.

A shopper may travel through the store with the mobile device 1805. A digital shopping list on the mobile device 1805 may include a list of items that the shopper may need to purchase. For example, the shopping list may include an item that matches the first product 1816*a*. When the shopper is close to the in-store smart shelf 1815, the mobile device 1805 may notify the shopper that the first product 1816*a* is currently available on the in-store smart shelf 1815. The shopper may remove the first product 1816*a* from the in-store smart shelf 1815 and place it into a smart shopping cart 1835. The smart shopping cart 1835 may read the first product tag 1820*a* as well as the product tags attached to other products that may have been placed in the smart shopping cart 1835. When the shopper is ready to checkout, the shopper may walk out of the store with the shopping cart 1835. As the shopper walks out of the store, the in-store smart checkout detector 1830 may detect the smart shopping cart 1835. The smart shopping cart 1835 may communicate with the in-store smart checkout detector 1830 and transmit information about the products in the smart shopping cart. The in-store smart checkout detector 1830 may send information about the products, such as the first product 1816*a*, and payment information from the mobile device 1805 to the merchant system 1810. The merchant system 1810 may receive information from the in-store smart checkout detector 1830 and the payment information and proceed to initiate purchase of the first product 1816*a*.

Referring to step 1505 of the process 1500 shown in FIG. 15, a wallet application on the mobile device 1805 may generate transaction data for transferring an amount of cryptocurrency matching the sale price of the first product 1816*a* from the shopper to the merchant. The wallet application may generate a public key for the transaction using the private key of the shopper. In order to indicate that the shopper is the originator of the transaction, a digital signature may also be generated for the transaction using the private key of the shopper. The transaction data may be sent to the server 1850 from the mobile device 1805.

The server 1850 may receive the transaction data from the mobile device 1805. At step 1510, the server 1850 may broadcast the transaction to the blockchain network 1030*a*. The transaction may be received by one or more nodes 1105 of the blockchain network 1030*a*. At step 1515, upon receiving the transaction, a node 1105 may choose to validate the transaction, for example, based on transaction fees associated with the transaction. If the transaction is not selected for validation by any of the nodes 1105, then the transaction may be placed in a queue and wait to be selected by a node 1105.

At step 1520, each of the nodes 1105 that selected the transaction may validate the transaction. At step 1525, if the transaction is successfully validated by a node 1105, the validated transaction is added to a block being constructed by that node 1105. At step 1535, the blockchain network 1030*a* may wait for a block to be published. At step 1540, if a block has not been published, then the process 1500 returns to step 1535 and waits for a block to be published. However, at step 1540, if a block has been published, then the process 1500 proceeds to step 1545.

At step 1545, the published block is broadcast to the blockchain network 1030a for validation. At step 1550, if the block is validated by a majority of the nodes 1105, then at step 1555, the validated block is added to the blockchain 1120. At step 1560, if the transaction was added to the blockchain 1120, the server 1850 may wait to receive a minimum number of blockchain confirmations for the transaction. At step 1565, if the minimum number of confirmations for the transaction have not been received, then the process may return to step 1560. However, if at step 1565, the minimum number of confirmations have been received, then the process proceeds to step 1570. At step 1570, the transaction may be executed and the sale price of the first product 1816a may be transferred from the shopper to the merchant.

When the in-store smart checkout detector 1830 sends information about the products, such as the first product 1816a, and payment information from the mobile device 1805 to the merchant system 1810, a smart contract may be created between the shopper and the merchant. For example, a smart contract between the shopper and the merchant may be created and then submitted to the blockchain network 1830a as a transaction. A notification may be received that an amount of cryptocurrency equal to the sale price of the first product 1816a was sent from a blockchain address associated with the shopper and was received at a blockchain address associated with the merchant by the time the first product 1816a is removed from the smart shopping cart 1835. If the payment for the first product 1816a was successfully transferred from the shopper to the merchant by the time the shopper removes the first product 1816a from the smart shopping cart 1835, then an electronic receipt may be generated and sent to the shopper. Otherwise, the merchant system 1810 may be alerted that the shopper is attempting to leave the premises without paying for the first product 1816a.

Blockchain Enabled In-Vehicle Purchasing

Figure 19:
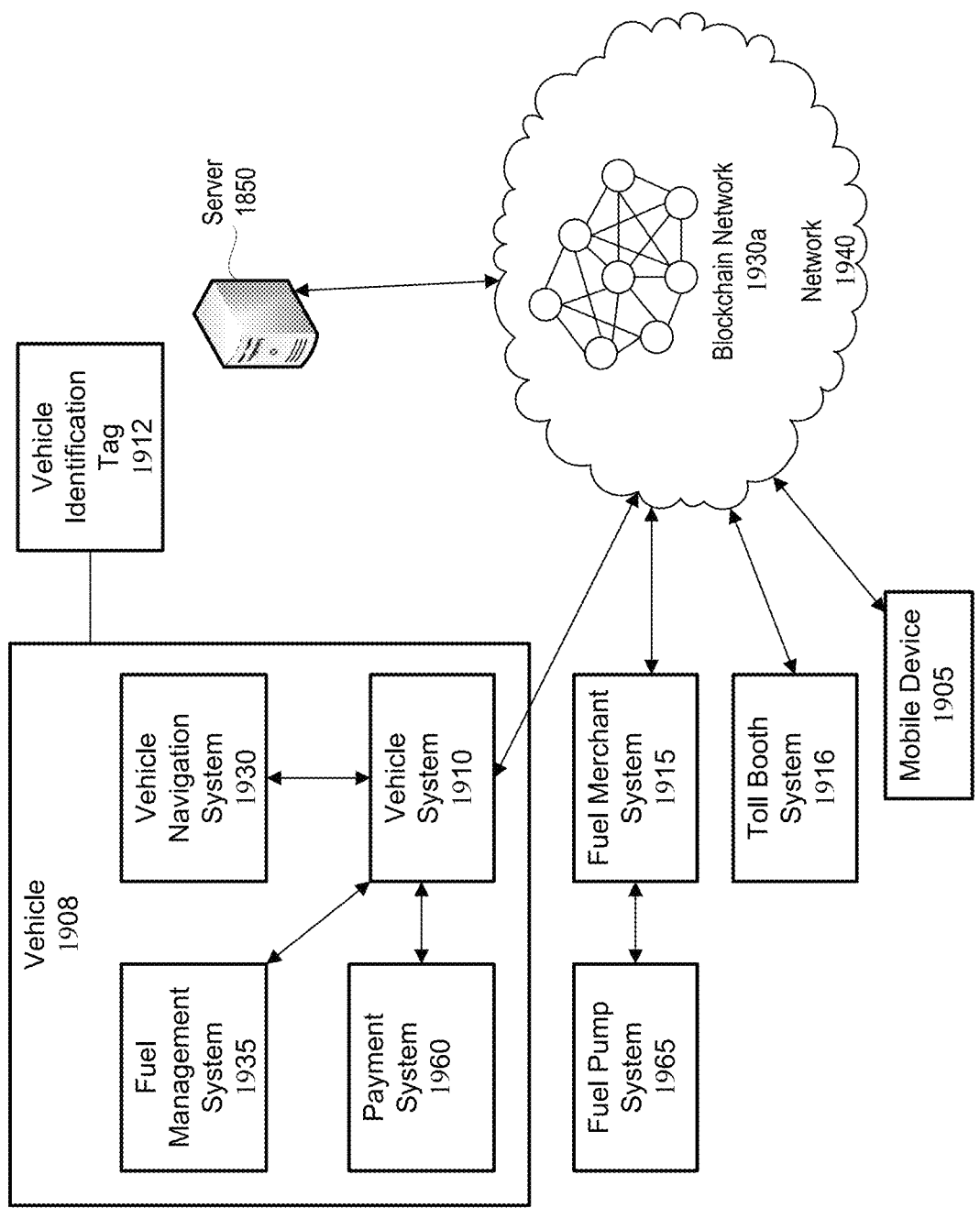
FIG. 19 illustrates an example of communications for an IoT blockchain enabled device system.

An example of blockchain enabled in-vehicle purchasing is described with reference to the system 1900 shown in FIG. 19, the process 1500 shown in FIG. 15 and the process 1601 shown in FIG. 16. FIG. 19 illustrates an example system 1900 for blockchain enabled in-vehicle purchasing. The system 1900 includes an IoT enable smart vehicle 1908. The vehicle 1908 may include one or more computing devices implementing a vehicle system 1910, a vehicle navigation system 1930, a payment system 1960 and a fuel management system 1935. The vehicle 1908 may include a RFID tag, such as a vehicle identification tag 1912. The system 1900 may also include various merchant systems, such as a fuel merchant system 1915, and a toll booth system 1916. The system 1900 may also include a mobile device 1905 belonging to a driver of the vehicle 1908.

When the driver gets into the vehicle 1908, payment information may be loaded from the driver's mobile device 1905 into the vehicle payment system 1910 so it is available for secure payments to other devices in order to complete in-vehicle purchases, such as in-vehicle purchase of fuel and in-vehicle payment of tolls. The driver of the smart vehicle may pay for parking, fast food, using the IoT enabled smart vehicle 1908. Additionally, the IoT enabled smart vehicle 1908 may also facilitate in-vehicle purchasing of smartphone apps, music, audio books, and other goods and services.

The fuel management system 1935 may perform various functions related to fuel usage and communicate with the vehicle system 1910. For example, the fuel management system 1935 may monitor fuel usage and based on detecting that the fuel is below a threshold, notify the vehicle system 1910. The vehicle system 1910 may communicate with the vehicle navigation system 1930 to determine nearby fuel stations. The selection of a fuel station to may be based on various factors, such as the availability of fuel at nearby fuel stations, the vehicle's current route and location, incentives that may be offered by nearby fuel stations, etc. The vehicle system 1910 may notify the driver about the selection of a fuel station and the vehicle 1908 may be re-routed to the selected fuel station. Upon arriving at the selected fuel station, the driver may pull up to a fuel pump. The fuel pump may include a fuel pump system 1965 configured to detect the RFID tags of vehicles, such as the vehicle identification tag 1912 in order to obtain an identification of the vehicles. The fuel pump system 1965 and the payment system 1960 may be configured to communicate with each other. The fuel payment system 1960 may send payment information to the fuel pump system 1965. After the driver has completed re-fueling, the driver may simply drive away. The fuel pump system 1965 may send the fuel merchant system 1915 information about the identification of the vehicle 1908, the amount of fuel purchased, and the payment information. The fuel merchant system 1915 may use the information to complete a transaction with the driver for the purchase of the fuel. For example, the fuel merchant system 1915 may communicate with the server 1950 to charge the driver for the fuel according to the process 1500 shown in FIG. 15. Additionally, the fuel merchant system 1915 may communicate with the server 1950 in order to create a smart contract between the driver and the fuel merchant. The smart contract may be created and executed according to the process 1601 shown in FIG. 16.

Augmented Reality (AR), Mixed Reality and Blockchain Based E-Commerce

AR or mixed reality enabled devices, such as wearable smart glasses, head mounted devices, holographic devices, or smartphone applications overlay digital content on top of a real world view, thus, enhancing a user's experience of the real world. The overlay content may be 3D models generated based on 3D scanning real world objects. AR enables users to experience online shopping in a virtual environment. For example, using AR, browse virtual stores and view 3D models of items for sale in virtual stores. Just as in the real world, customers may be able to handle and examine various physical details of the products. Blockchain smart contracts may be utilized to provide an e-commerce platform where customers may purchase items from online merchants with cryptocurrency and digital wallets. Information about a product, such as country of origin, materials, ingredients, price, description, measurements, terms and conditions, 3D model of the physical product, etc., may be hashed and recorded in a blockchain. This provides proof of ownership of virtual goods and products and enables accurate tracking of any changes made to this information. Artificial intelligence (AI) may be utilized for generating 3D models of products based on 2D images of the products. Smart contracts may be utilized to conduct transactions between merchants and customers.

As an example, a customer may shop for clothing by browsing different stores in a virtual shopping mall via a wearable AR device, such as a pair of smart glasses. The customer may examine a 3D model of a shirt as he or she would in the real world. Additionally, the customer may virtually try on the shirt using a 3D model of the customer's body. If the customer decides to purchase the shirt, the customer may initiate a transaction with the merchant of the store. A transaction may be submitted to the blockchain via the customer's digital wallet to transfer money (cryptocurrency) from the customer to the merchant. Various smart contracts may be utilized to implement various aspects of the e-commerce process. For example, based on detecting that the sale price of the shirt has been successfully transferred from the customer to the merchant, a smart contract may be executed to initiate shipment of the shirt from the merchant's warehouse to the customer. As described above with reference to supply chain monitoring and tracking, RFID tags and other IoT devices may be utilized to track the shipment of the shirt from the merchant's warehouse to the delivery of the shirt to the customer's residence.

Quantum Computing

One of the concerns of quantum computing is that it may increase the probability of breaking cryptographic algorithms and thus, weaken overall security for the blockchain. This may be addressed by requiring larger key sizes for blockchain asymmetric-key pairs of cryptographic algorithms. In some cases, if there is a concern that a block may be decrypted in the future, a dynamically changing cryptographic hash may be utilized. A different cryptographic hash may be dynamically selected for a particular block or the entire blockchain based on various factors, such as whether there is a concern that the block will be decrypted in the future, increasing a strength of the hash, utilizing a hash that is better suited for protecting privacy. In some cases, different cryptographic hashes may be selected for different blocks.

Anonymity and Privacy

As discussed above, the use of a private/public key pair to establish user authenticity during validation of a blockchain transaction provides some privacy as it does not reveal user identity. However, the transactions stored on a blockchain may be visible to the public. It has been shown that user identity may be derived from the publicly available transaction information.

Blockchain Size

Depending on a frequency at which events are recorded in a blockchain, the size of the blockchain may grow quickly. Computing/storage capacity (i.e., faster processors, larger storage components) may be needed to support the expansion of the blockchain. In some cases, blocks may be compressed prior to being added to the chain. In some cases, blocks may be eliminated, for example, at the beginning of the blockchain, when they become stale or irrelevant. As an example, a method for "replacing" the first 14000 transactions with a new block that effectively mimics the hash of the 14000 transactions may be useful for managing blockchain size.

Blockchain Immutability

In some cases, content in a blockchain may need to be deleted. For example, content may need to be deleted if there is a security breach or if the content is no longer relevant. A level of immutability of a blockchain may depend on a type of the blockchain. For example, changing content may be difficult in a public blockchain due to its possible impact on a large number of users. According to some techniques, data stored in a private blockchain, or a public blockchain controlled by a few entities may be changed by recording a flag (current block) where the change is being made, and adding the current block (referred to by the flag) to the blockchain. The added block may then indicate the change made to the previous block.

As another example, a blockchain may need to be changed to resolve a broken link. For example, the hash of a changed block may no longer match the hash stored in the block+1. In some cases, the blockchain may need to be changed in order to reverse the results of illegal transactions. In some cases, the blockchain may need to be changed to address software errors, erroneous transactions, or remove information that is confidential or required by law to be removed. If the blockchain is immutable, these errors and information may be permanently embedded in the blockchain. Additionally, the blockchain may need to be changed to comply with regulatory concerns, such as the European Union's incoming General Data Protection Regulation (GDPR), or California Consumer Privacy Act (CCPA), regarding consumer data privacy and ownership rights, US Fair Credit Reporting Act, and the SEC's "Regulation S—P," which require that recorded user identifiable personal financial data be redactable.

Some techniques may allow modifications to the blockchain to address software errors, legal and regulatory requirements, etc., by allowing designated authorities to edit, rewrite or remove previous blocks of information without breaking the blockchain. Such techniques may enable blockchain editing by using a variation of a "chameleon" hash function, through the use of secure private keys. This editing may allow smart contracts that were flawed at issue to be updated so that the changes carry over to subsequent smart contracts in the blockchain. Using these techniques, blocks that have been changed may be using a "scar" or mark that cannot be removed, even by trusted parties.

According to some techniques, when a block is hashed, any confidential information, such as personally identifiable information, and IP addresses, is not included in the hash because it is not part of the data values that were hashed. But because there is no hash of the confidential information, it may be changed. According to some techniques, the confidential information may not be placed or recorded into the blockchain. Rather the information may reside in a file that is external to the blockchain. A hash of that file, however, may be recorded in the blockchain. For example, a user's confidential information may be deleted locally without affecting the blockchain.

As another example, assuming that all content included in a block in a blockchain cannot be changed after a block is added to the blockchain, a determination may be made before adding data to the blockchain of whether some or all of that data may need to be deleted at a later time. For example, confidential information (i.e., data to be deleted at a later time) may be stored as a file that is external to the block and the blockchain. For the purposes of creating the block, a link to the file containing the confidential information and a hash of the file containing the confidential information file may be added to the block. An example of a link would be an HTTP link. During confirmation of the block that is to be added to the blockchain, the network nodes may be able to access the confidential information and verify that the confidential information based on the hash value of the file in the block. Because the hash value of the file is a part of the block, the file containing the confidential information may not be easily changed. However, it may be possible to change the confidential information file by changing the data therein and adding a nonce. This may seek to change the nonce until the resulting hash equals the hash that is stored in the blockchain. However, this would be difficult (probably near impossible), and an inspection of the modified confidential information file would reveal the added nonce, which may then raise suspicion that information was changed since it was first added to the blockchain.

Files containing confidential information may be encrypted (e.g., through an asymmetric key encryption function) prior to the hashing operation. When "deleting" the confidential information, the file containing the confidential information may be deleted or removed resulting in the link, which is stored in the blockchain, being ineffective for retrieving the file. The hash of the file, and the link, remain in the blockchain so that the linking of the blocks through hash functions is not affected. However, because of this change, a transaction that is part of the block or part of a different special block could be added to the blockchain to indicate that the link is no longer effective, and the confidential information file is no longer part of the blockchain. This may effectively keep confidential information out of the blockchain while providing the confidential information to users of the blockchain and proof of authenticity of the confidential information before it is deleted from the blockchain. This may come with drawbacks because access to data implies that such data may be stored. Accordingly, those with access to the confidential information file, while it was part of the blockchain, may have stored that information in another location that may no longer be reachable during the "deleting" operation discussed above.

51% Attack

A "51% attack" refers to an individual mining node or a group of mining nodes controlling more than 50% of a blockchain network's mining power, also known as hash rate or hash power. The hash rate is a measure of the rate at which hashes are being computed on the blockchain network. As described above, hashing may include taking an input string of a given length, and running it through a cryptographic hash function in order to produce an output of a fixed length. A blockchain network's hash rate may be expressed in terms of 1 KH/s (kilohash per second) which is 1,000 hashes per second, 1 MH/s (megahash per second) which is 1,000,000 hashes per second, 1 TH/s (terahash per second) which is 1,000,000,000,000 hashes per second, or 1 PH/s (petahash per second) which is 1,000,000,000,000,000 hashes per second. As an example, a mining node in a blockchain utilizing a proof of work consensus model (PoW) may perform hashing in order to find a solution to a difficult mathematical problem. The hash rate of the mining node may depend on the computational resources available to that node. A mining node that successfully solves the mathematical problem may be able to add a block to the blockchain. Thus, by ensuring that invalid transactions cannot be included in a block, mining nodes increase the reliability of the network. Transactions may be deemed invalid if they attempt to spend more money than is currently owned or engage in double-spending. If a mining node intentionally or unintentionally includes an invalid transaction in a block, then the block will not be validated by the network. Additionally, nodes that accept the invalid block as valid and proceed to add blocks on top of the invalid block will also end up wasting computational resources. Thus, mining nodes are discouraged from cheating by intentionally adding invalid transactions to blocks and accepting invalid blocks as valid.

Figure 17A:
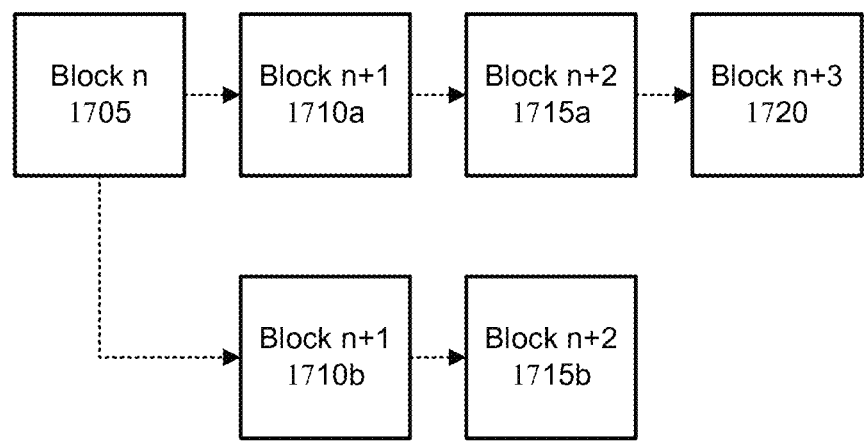
FIG. 17A shows an example of a privately broadcasted blockchain.

An entity may be able to disrupt the network by gaining control of 50% of a network's hash rate. In a 51% attack, a blockchain node may intentionally reverse or overwrite transactions and engage in double-spending. When a node generates a valid block of transactions, it broadcasts the block to the network for validation. In some cases, a node controlling more than 50% of a network's hash rate may mine blocks in private without broadcasting them to the network. In such a scenario, the rest of the network may follow a public version of the blockchain while the controlling node may be following its private version of the blockchain. FIG. 17A shows a fraudulent and valid version of a blockchain. The valid blockchain on the top comprises the valid blocks 1705, 1710*a*, 1715*a*, and 1720. The fraudulent blockchain on the bottom is not broadcast to the network and includes the blocks 1705, 1710*b*, 1715*b*, and an invalid block 1720.

Figure 17B:
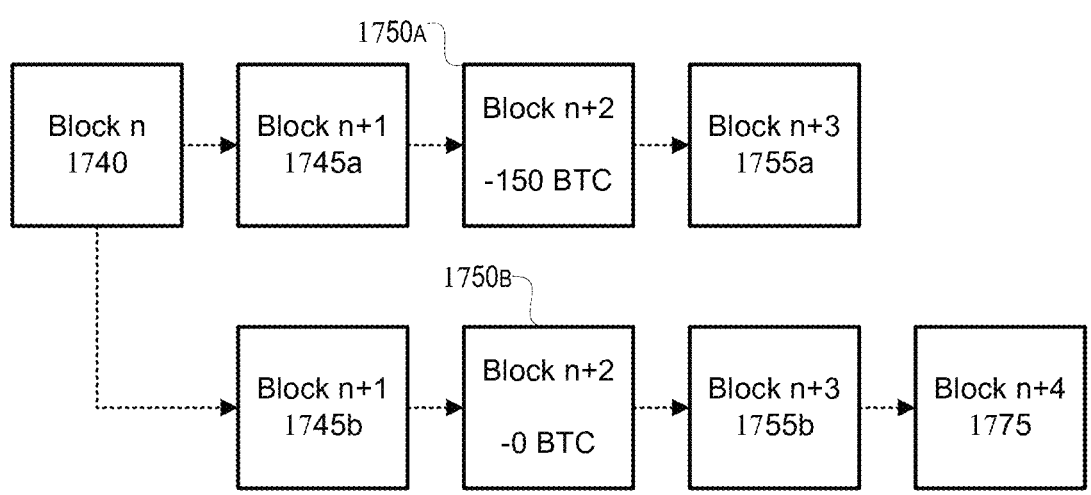
FIG. 17B shows an example of blockchain misuse.

FIG. 17B shows another fraudulent and valid version of a blockchain. The valid version of the blockchain includes nodes 1740, 1745*a*, 1750*a*, and 1755*a*. The fraudulent version of the blockchain includes nodes 1740, 1745*b*, 1750*b*, 1755*b*, and 1775. However, following the longest chain rule, the network may select and utilize the private or fraudulent blockchain comprising nodes 1740, 1745*b*, 1750*b*, 1755*b* and 1775. Since it is the longest chain, previous transactions may be updated according to this chain. The cheating node may include transactions that spend money, such as the block 1750*b* including the transaction for 1450 BTC, on the public or fraudulent version of the blockchain without including these transactions in the private version of the blockchain. Thus, in the private version of the blockchain, the cheating node may continue to own the spent 1450 BTC. When the cheating node controls more than 50% of the hashing resources of the network, it may be able to broadcast its private version of the blockchain and continue to create blocks on the private blockchain faster than the rest of the network, thus, resulting in a longer blockchain. Since there are two versions of the blockchain, the network may select the longest or fraudulent private blockchain as the valid blockchain. As a result, the rest of the network may be forced to use the longer blockchain. The public or valid version of the blockchain may then be discarded or abandoned and all transactions in this blockchain that are not also in the private or fraudulent version of the blockchain may be reversed. The controlling or cheating node may continue to own the spent money because the spending transactions are not included on the fraudulent version of the blockchain, and the cheating node may, therefore, spend that money in future transactions.

Because of the financial resources needed to obtain more hashing power than the rest of the entire network combined, a successful 51% attack may generally be challenging to achieve. However, it would be less expensive to achieve a 51% attack on a network with a lower hash rate than one with a higher has rate. Additionally, the probability of a successful 51% attack increases with the use of mining pools in which multiple nodes may combine their computational resources, for example, when mining is performed from the same mempool.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor; and
a non-transitory computer-readable medium having stored thereon computer-executable instructions that are executable by the system to cause the system to perform operations comprising:
deploying, by a first entity, a policy smart contract on a blockchain to analyze a first smart contract deployed by a second entity, wherein the policy smart contract is governed by a set of rules, wherein the policy smart contract performs a first assessment that includes analyzing a set of functionalities of the first smart contract and detecting a set of vulnerabilities associated with the first smart contract based on the set of rules;
determining at a first time a risk score corresponding to the first smart contract based on the analyzing the set of functionalities of the first smart contract and the detecting; and
in response to determining that the risk score is above a threshold score, restricting users of a first platform corresponding to the first entity from accessing the first smart contract.

2. The system of claim 1, the operations further comprising:
determining, using a machine learning algorithm, one or more recommendations corresponding to the first smart contract; and
providing the one or more recommendations to the second entity.

3. The system of claim 1, the operations further comprising:
identifying, using a machine learning algorithm, one or more updates for the set of rules based on analyzing a set of other smart contracts or a set of compromised features of the first smart contract; and
based on the analyzing the set of other smart contracts or the set of compromised features of the first smart contract, automatically updating the set of rules.

4. The system of claim 1, the operations further comprising:
identifying, using a machine learning algorithm, one or more updates for the set of rules based on analyzing a set of other smart contracts or a set of compromised features of the first smart contract; and
based on the analyzing the set of other smart contracts or the set of compromised features of the first smart contract, generating a notification regarding updating the set of rules.

5. The system of claim 1, further comprising updating the set of rules, re-assessing at a second time the risk score, and if the risk score is below the threshold re-establishing access for the users of the first platform corresponding to the first entity to the first smart contract.

6. The system of claim 1, wherein the detecting a set of vulnerabilities associated with the first smart contract based on the set of rules includes detecting one or more decentralized finance (DeFi) related vulnerabilities associated with the first smart contract.

7. The system of claim 1, wherein the second entity is a decentralized finance (DeFi) entity.

8. The system of claim 1, wherein one or more assessments of the first smart contract are performed at a first frequency by the policy smart contract.

9. The system of claim 8, the operations further comprising updating the first frequency to a second frequency based on analyzing one or more factors corresponding to the first smart contract or one or more factors corresponding to one or more other smart contracts.

10. The system of claim 1, the operations further comprising writing results of the analysis of the first smart contract to the blockchain.

11. The system of claim 8, wherein the first entity is a decentralized entity.

12. A computer-implemented method, comprising:
deploying, by a first entity, a policy smart contract on a blockchain to analyze a first smart contract deployed by a second entity, wherein the policy smart contract is governed by a set of rules, wherein the policy smart contract performs a first assessment that includes analyzing one or more functionalities of the first smart contract and detecting for one or more vulnerabilities associated with the first smart contract based on the set of rules;
determining a risk score corresponding to the first smart contract based on the analyzing the one or more functionalities of the first smart contract and the detecting;
based on the determined risk score, determining whether to restrict one or more users
of a first platform corresponding to the first entity from accessing the first smart contract by users of a first platform corresponding to the first entity.

13. The computer-implemented method of claim 12, further comprising:
determining that the determined risk score is above a threshold and restricting access to the first contract by users of the first platform corresponding to the first entity.

14. The computer-implemented method of claim 12, further comprising:
determining, using a machine learning algorithm, one or more recommendations corresponding to the first smart contract; and
providing the one or more recommendations to the second entity.

15. The computer-implemented method of claim 13, further comprising:
identifying, using a machine learning algorithm, one or more updates for the set of rules based on analyzing a set of other smart contracts or a set of compromised features of the first smart contract; and
based on the analyzing the set of other smart contracts or the set of compromised features of the first smart contract, automatically updating the set of rules.

16. The computer-implemented method of claim 12, further comprising:
identifying, using a machine learning algorithm, one or more updates for the set of rules based on analyzing a set of other smart contracts or a set of compromised features of the first smart contract; and
based on the analyzing the set of other smart contracts or the set of compromised features of the first smart contract, generating a notification regarding updating the set of rules.

17. The computer-implemented method of claim 15, further comprising updating the set of rules, re-assessing at a new time the risk score, and if the risk score is below the threshold re-establishing access for the users of the first platform corresponding to the first entity to the first smart contract.

18. The computer-implemented method of claim 13, wherein the detecting a set of vulnerabilities associated with the first smart contract based on the set of rules includes detecting one or more decentralized finance (DeFi) related vulnerabilities associated with the first smart contract.

19. A system comprising:
   a memory; and
   a processor that executes computer executable instructions stored in the memory, the instructions comprising one or more components, the components comprising:
      a deployment component that deploys a policy smart contract on a blockchain to analyze a first smart contract deployed by a first contract issuer, wherein the policy smart contract is governed by a set of rules, wherein the policy smart contract performs a first assessment that includes analyzing one or more functionalities of the first smart contract and detecting for one or more vulnerabilities associated with the first smart contract based on the set of rules;
      a risk component that determines a risk score corresponding to the first smart contract based on the analyzing the one or more functionalities of the first smart contract and the detecting;
      an access component that based on the determined risk score, manages access to the first smart contract by users of a first platform corresponding to deployment of the policy smart contract; and
      a recommendation component that generates, using a machine learning algorithm, one or more recommendations corresponding to the first smart contract, and provides the one or more recommendations to the first contract issuer.

20. The system of claim 19, further comprising:
   an update component that identifies, using the machine learning algorithm, one or more updates for the set of rules based on analyzing a set of other smart contracts or a set of compromised features of the first smart contract, and based on the analyzing the set of other smart contracts or the set of compromised features of the first smart contract, automatically updates the set of rules.

* * * * *